(12) United States Patent
Shimada

(10) Patent No.: US 10,634,874 B2
(45) Date of Patent: Apr. 28, 2020

(54) ZOOM LENS AND IMAGING APPARATUS

(71) Applicant: FUJIFILM Corporation, Tokyo (JP)

(72) Inventor: Yasutaka Shimada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 82 days.

(21) Appl. No.: 15/999,029

(22) Filed: Aug. 20, 2018

(65) Prior Publication Data

US 2019/0064478 A1 Feb. 28, 2019

(30) Foreign Application Priority Data

Aug. 22, 2017 (JP) ................. 2017-159235

(51) Int. Cl.
| | | |
|---|---|---|
| *G02B 15/14* | (2006.01) | |
| *G02B 9/60* | (2006.01) | |
| *G02B 27/00* | (2006.01) | |
| *G02B 13/06* | (2006.01) | |
| *G02B 13/02* | (2006.01) | |
| *G02B 15/17* | (2006.01) | |
| *G02B 15/20* | (2006.01) | |
| *G02B 15/16* | (2006.01) | |
| *G02B 15/167* | (2006.01) | |
| *G02B 13/00* | (2006.01) | |

(Continued)

(52) U.S. Cl.
CPC .............. *G02B 9/60* (2013.01); *G02B 13/02* (2013.01); *G02B 13/06* (2013.01); *G02B 15/17* (2013.01); *G02B 27/0037* (2013.01); *G02B 5/005* (2013.01); *G02B 13/009* (2013.01); *G02B 13/0045* (2013.01); *G02B 13/18* (2013.01); *G02B 15/14* (2013.01); *G02B 15/16* (2013.01); *G02B 15/167* (2013.01); *G02B 15/20* (2013.01); *G02B 15/24* (2013.01)

(58) Field of Classification Search
CPC ...... G02B 13/0045; G02B 9/60; G02B 13/18; G02B 5/005; G02B 15/20; G02B 13/009; G02B 13/06; G02B 15/14; G02B 15/16; G02B 13/02; G02B 15/17; G02B 15/167; G02B 15/24; G02B 27/0037
USPC ......... 359/676, 683–686, 714, 740, 763–765
See application file for complete search history.

(56) References Cited

U.S. PATENT DOCUMENTS

| | | | |
|---|---|---|---|
| 2015/0234165 A1 | 8/2015 | Sakamoto | |
| 2015/0241676 A1* | 8/2015 | Komatsu | G02B 15/17 359/683 |

(Continued)

FOREIGN PATENT DOCUMENTS

| | | |
|---|---|---|
| JP | 2015-094866 A | 5/2015 |
| JP | 2015-152798 A | 8/2015 |

*Primary Examiner* — Evelyn A Lester

(74) *Attorney, Agent, or Firm* — Studebaker & Brackett PC

(57) ABSTRACT

The zoom lens consists of, in order from an object side, a first lens group having a positive power, a second lens group having a negative power, a third lens group having a negative power, a stop, a fourth lens group having a positive power, and a fifth lens group having a positive power. During zooming, the first lens group and the fifth lens group remain stationary, and the other lens groups and the stop move. The most image side positive lens is disposed to be closest to the image side in the first lens group. The following conditional expression relating to a partial dispersion ratio $\theta gF1p$ of the most image side positive lens between the g line and the F line and an Abbe number $\nu 1p$ is satisfied: $0.6376 < \theta gF1p + 0.0017 \times \nu 1p < 0.7$.

20 Claims, 12 Drawing Sheets

EXAMPLE 1

(51) Int. Cl.
  *G02B 15/24* (2006.01)
  *G02B 13/18* (2006.01)
  *G02B 5/00* (2006.01)

(56) References Cited

U.S. PATENT DOCUMENTS

2016/0062094 A1* 3/2016 Kawamura ............ G02B 15/17
  359/684
2016/0091698 A1* 3/2016 Ikeda ................... G02B 15/177
  359/683

* cited by examiner

FIG. 2
EXAMPLE 1
WIDE
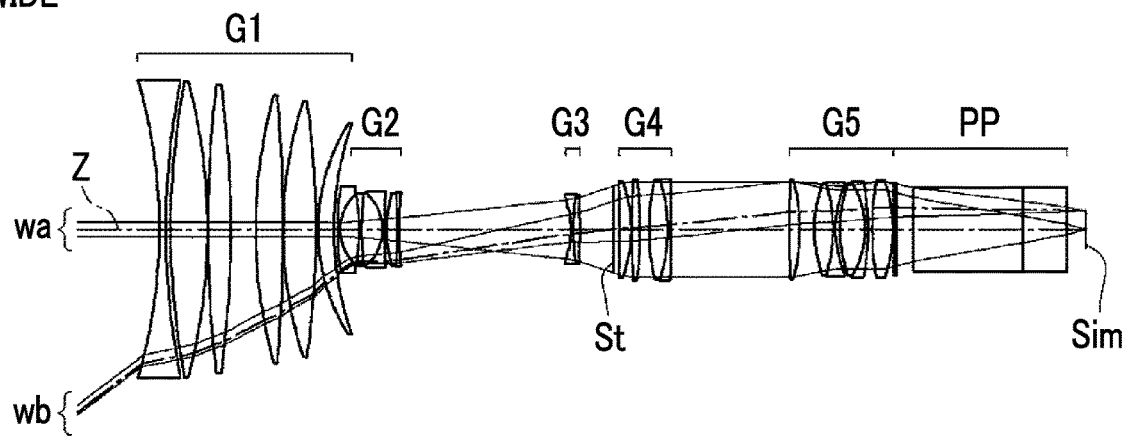
MIDDLE
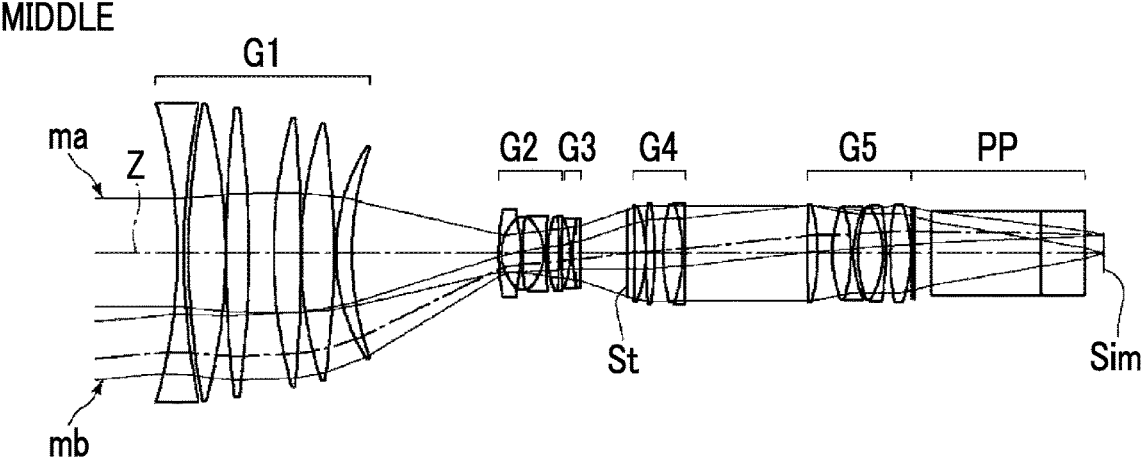
TELE
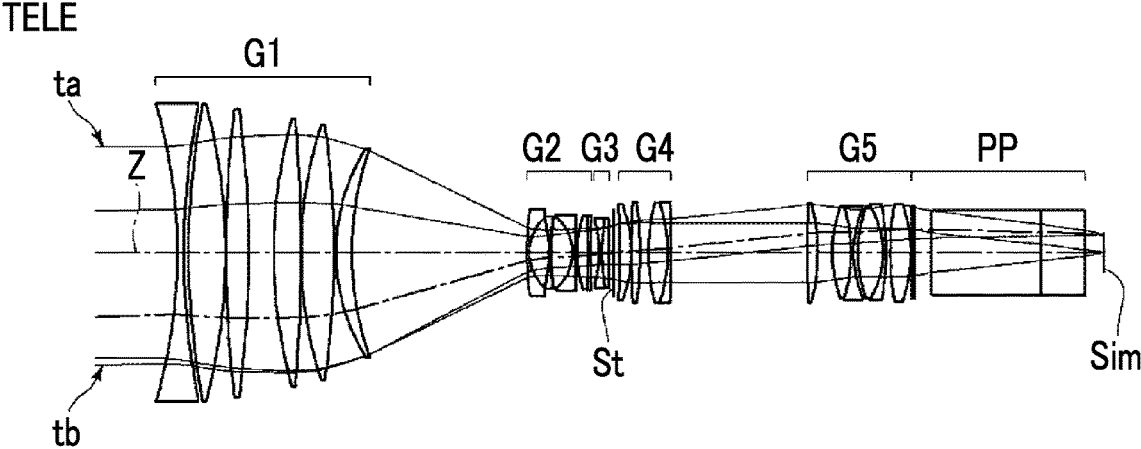

EXAMPLE 4

EXAMPLE 5

FIG. 7
EXAMPLE 1
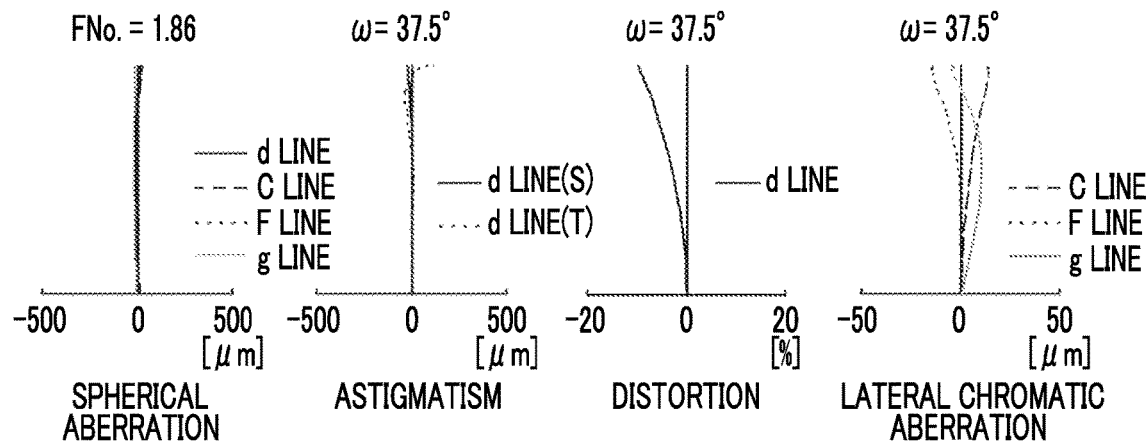
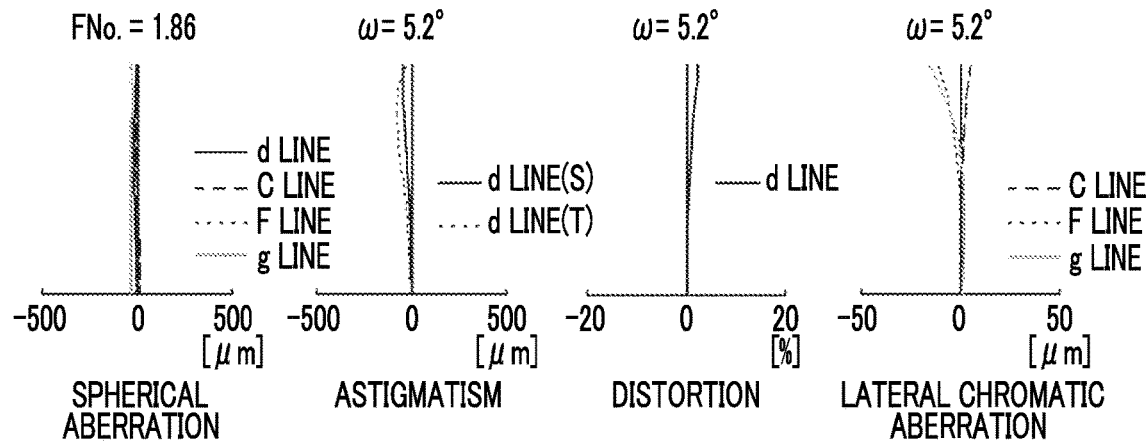
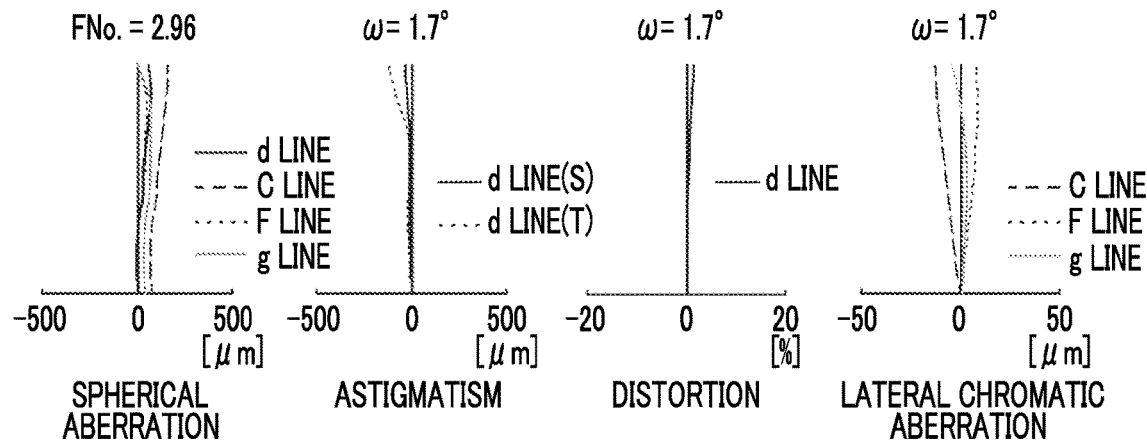

FIG. 8
EXAMPLE 2
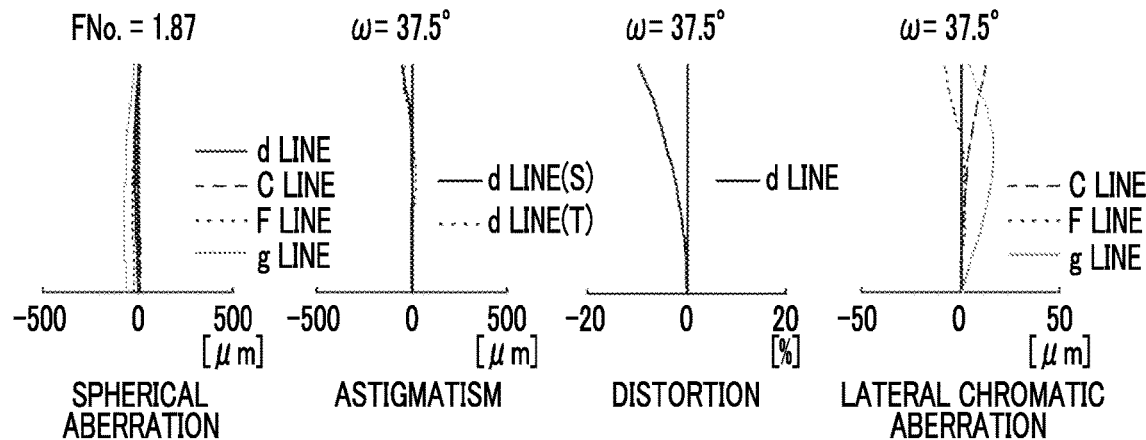
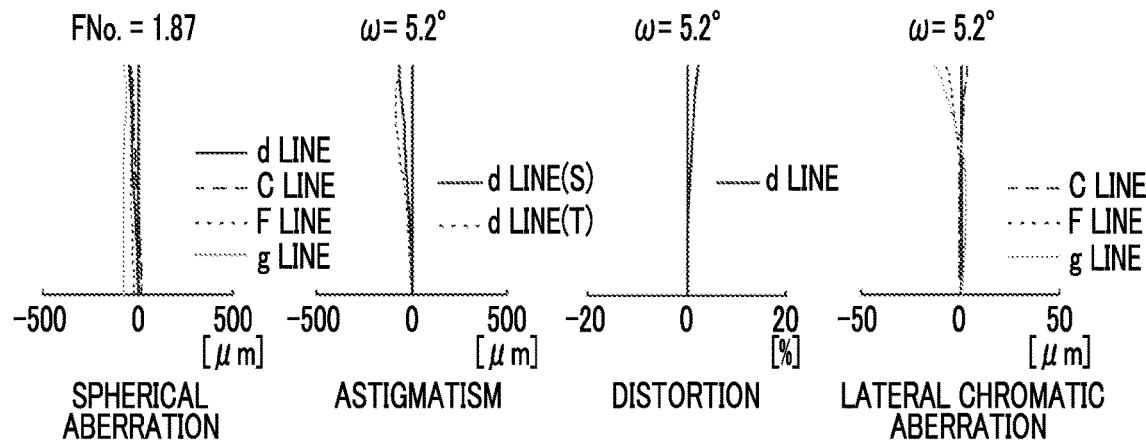
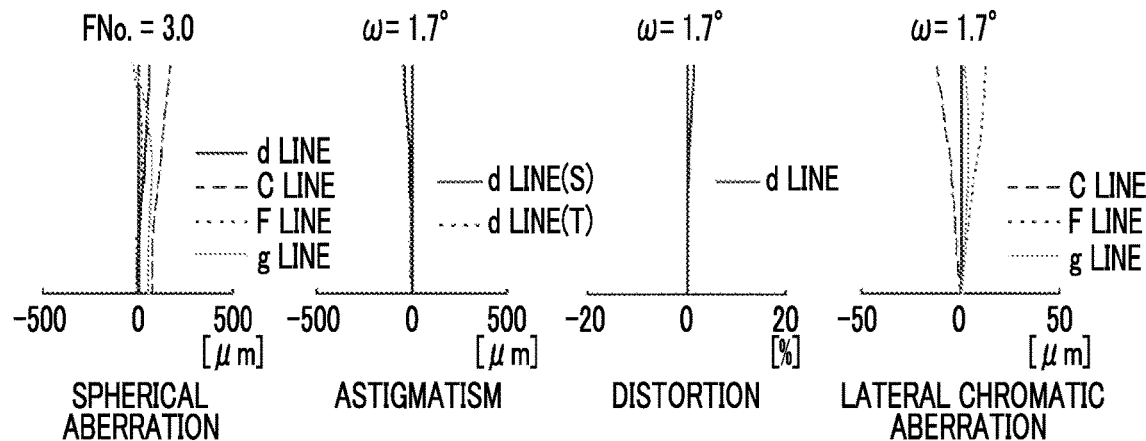

FIG. 9
EXAMPLE 3
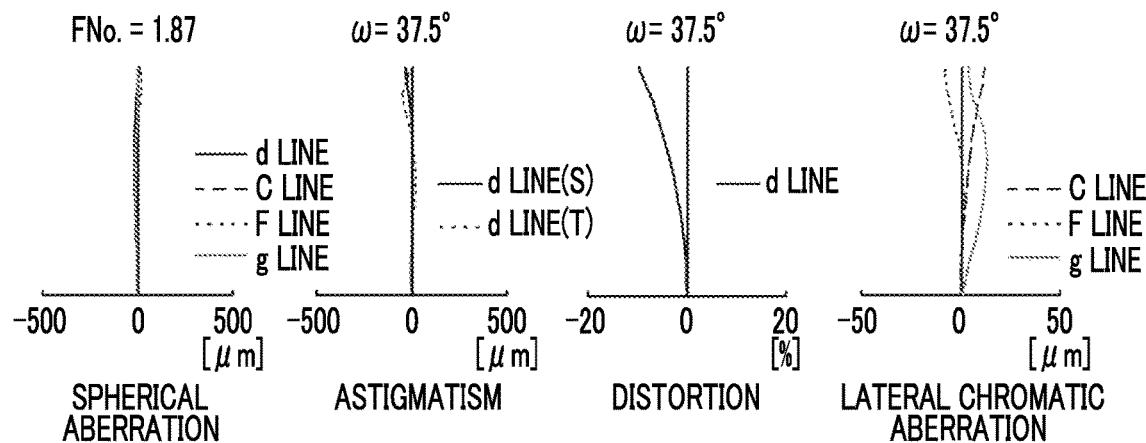
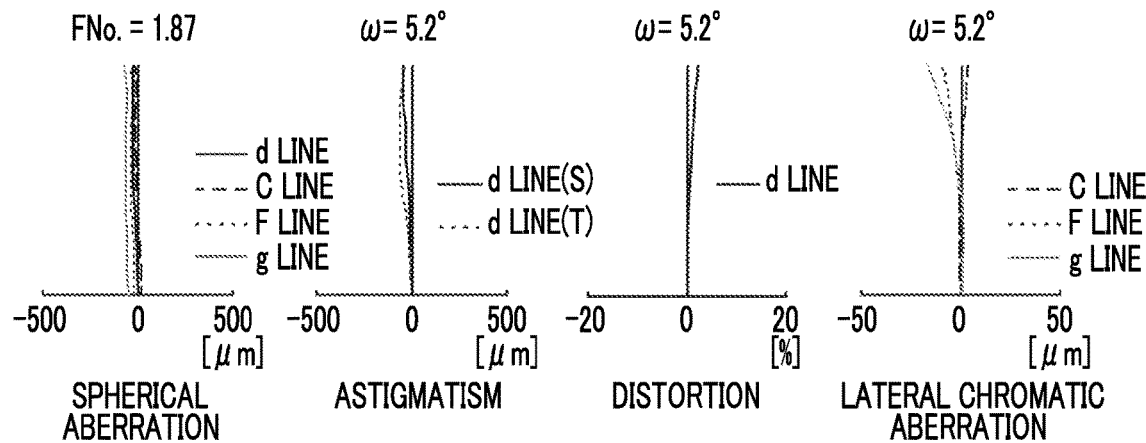
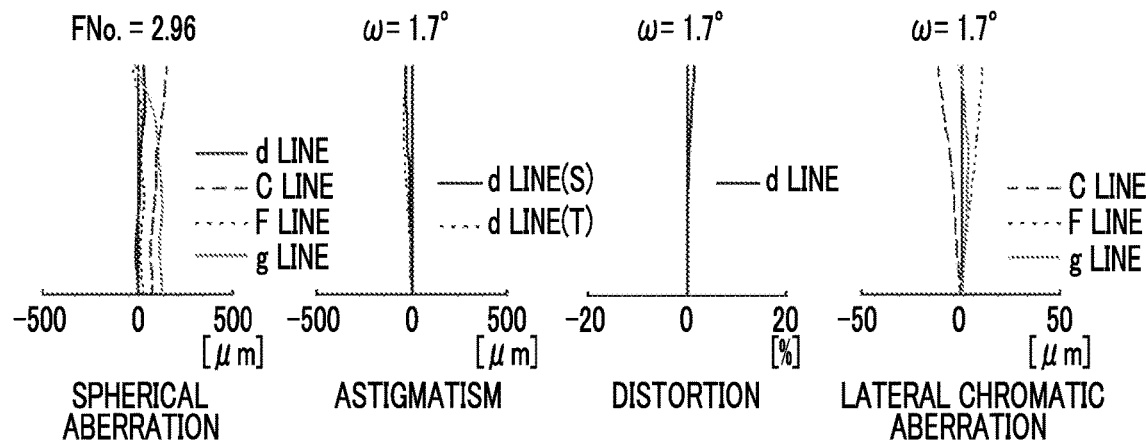

FIG. 10
EXAMPLE 4
WIDE
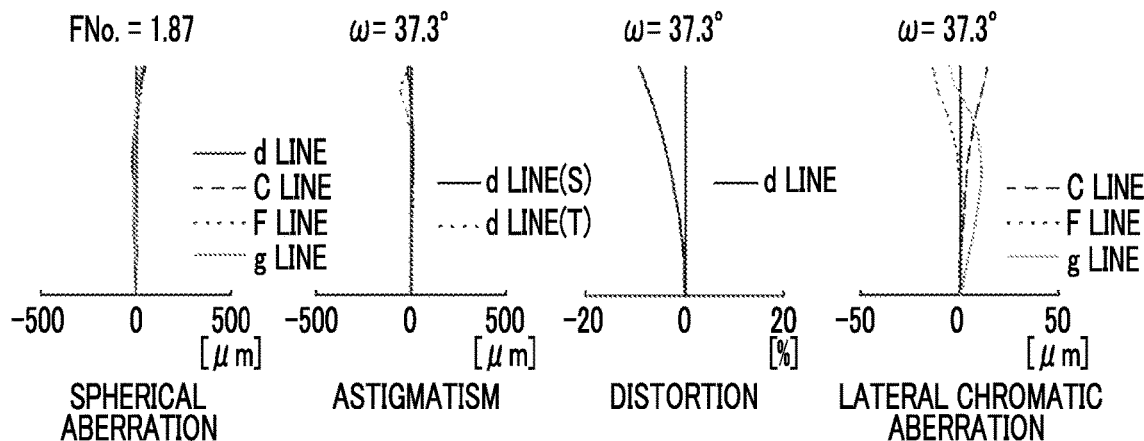
MIDDLE
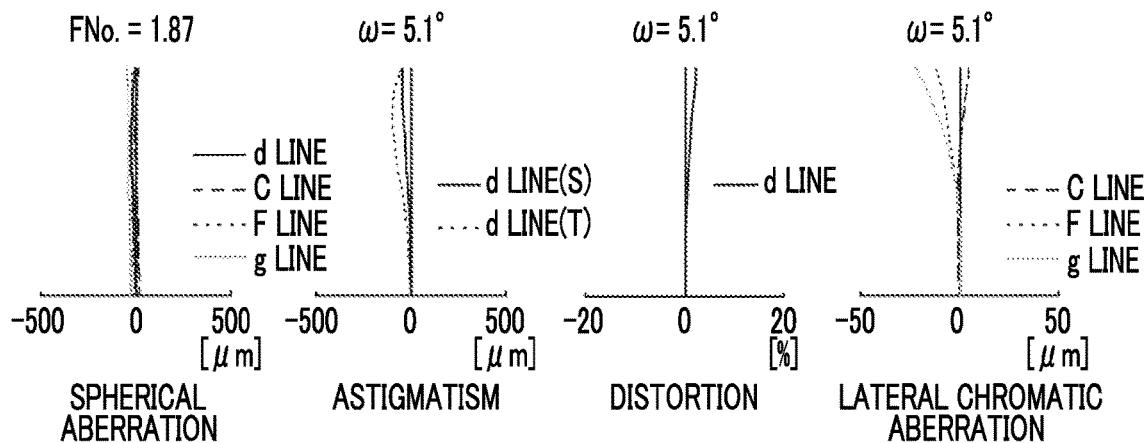
TELE
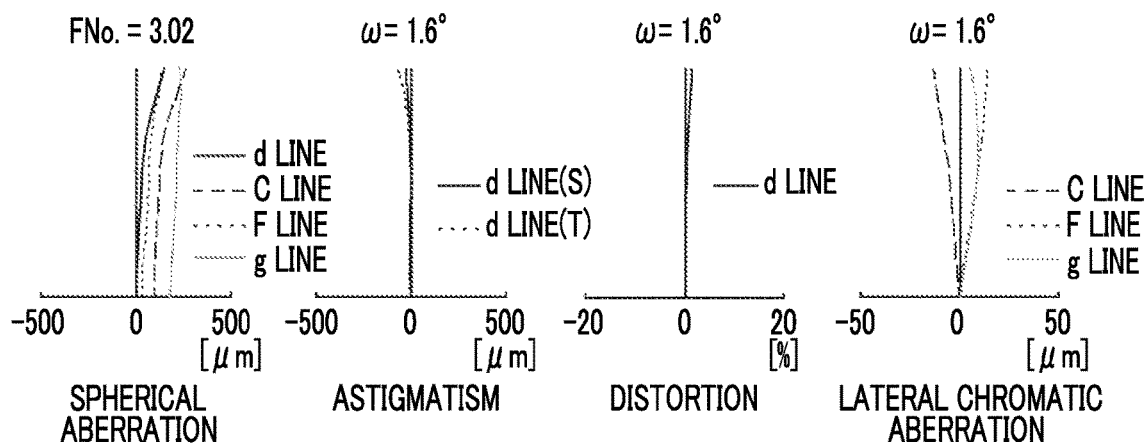

FIG. 11
EXAMPLE 5
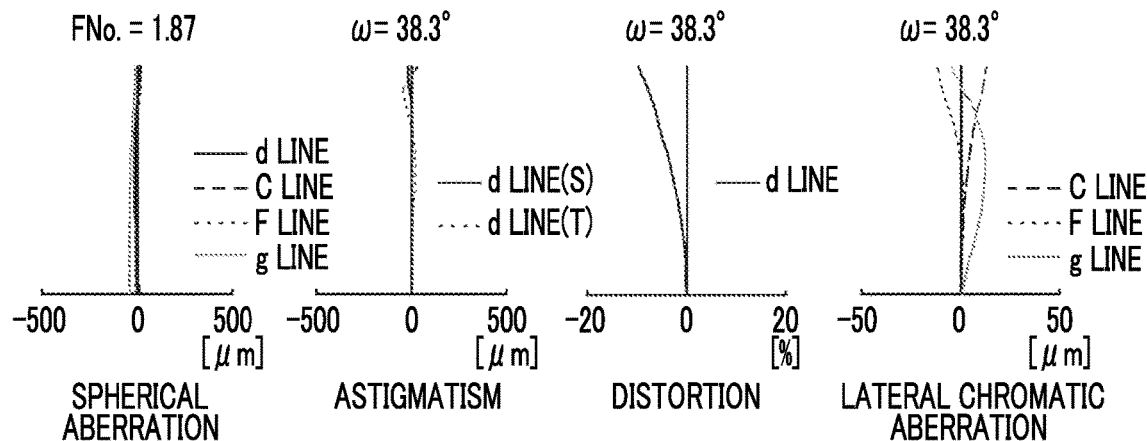
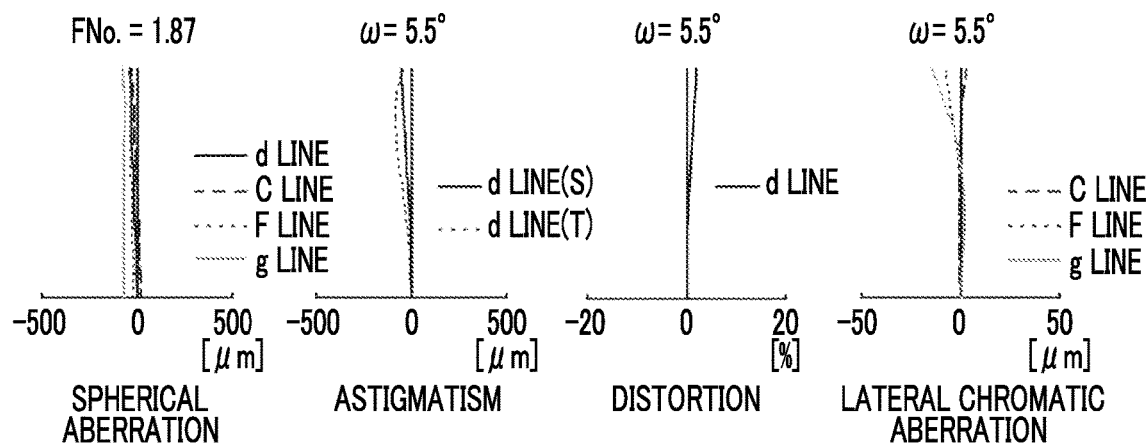
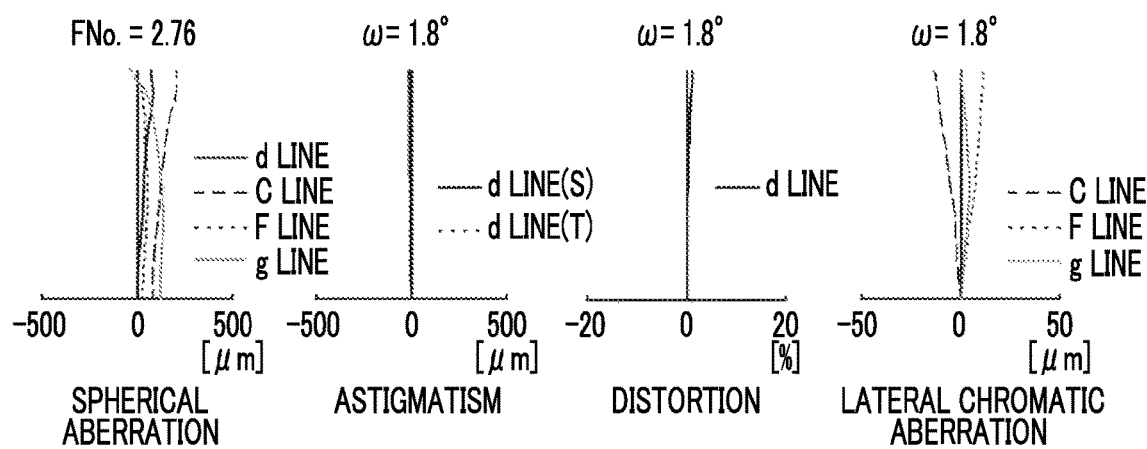

ZOOM LENS AND IMAGING APPARATUS

CROSS-REFERENCE TO RELATED APPLICATIONS

The present application claims priority under 35 U.S.C. § 119 to Japanese Patent Application No. 2017-159235, filed on Aug. 22, 2017. The above application is hereby expressly incorporated by reference, in its entirety, into the present application.

BACKGROUND OF THE INVENTION

1. Field of the Invention

The present invention relates to a zoom lens and an imaging apparatus, and more particularly to a zoom lens, which is suitable for a broadcast camera, a movie imaging camera, a digital camera, a video camera, a surveillance camera, and the like, and an imaging apparatus comprising the zoom lens.

2. Description of the Related Art

In the related art, a zoom lens having a four-group or five-group configuration has been used in a broadcast camera, a movie imaging camera, and a digital camera. For example, JP2015-152798A and JP2015-94866A disclose zoom lenses of a type which can be used in the above-mentioned camera and in which a lens group having a positive refractive power is disposed to be closest to the object side and the total length of the lens system is invariant during zooming.

SUMMARY OF THE INVENTION

In the cameras, there is a demand for a compact and lightweight zoom lens having a high zoom ratio. However, in the zoom lens of the above type, the lens group closest to the object side tends to become large and heavy in a case of increasing the zoom ratio. In addition, in recent years, the number of pixels of an imaging element used in combination with a zoom lens is increasing. Thus, there is a demand for a zoom lens in which various aberrations including chromatic aberration are more highly corrected.

However, it is preferable that the zoom lens described in JP2015-152798A has a long lens system length and is further reduced in size in order to cope with the recent demands. In the zoom lens described in JP2015-152798A, the outer diameter of the lens group closest to the object side and the length thereof in the direction of the optical axis are large. Thus, there is a problem in that weight reduction is not easy or the zoom ratio thereof is lower than a zoom ratio necessary for the recent demands. In addition, the zoom lens described in JP2015-94866A also has a problem that the zoom ratio is lower than a zoom ratio necessary for the recent demands.

The present invention has been made in consideration of the above-mentioned situation, and its object is to provide a zoom lens, which has favorable performance since reduction in size and weight is achieved and various aberrations including chromatic aberration are satisfactorily corrected while a high zoom ratio is ensured, and an imaging apparatus comprising the zoom lens.

In order to solve the problems, a zoom lens of the present invention consists of, in order from an object side to an image side: a first lens group that has a positive refractive power; a second lens group that has a negative refractive power; a third lens group that has a negative refractive power; a stop; a fourth lens group that has a positive refractive power; and a fifth lens group that has a positive refractive power. During zooming from a wide-angle end to a telephoto end, the first lens group and the fifth lens group remain stationary with respect to an image plane, the second lens group, the third lens group, the stop, and the fourth lens group move in a direction of an optical axis, and all distances between adjacent lens groups in the direction of the optical axis changes. A most image side positive lens having a positive refractive power is disposed to be closest to the image side in the first lens group. In addition, assuming that a partial dispersion ratio of the most image side positive lens between a g line and an F line is $\theta gF1p$ and an Abbe number of the most image side positive lens at a d line is $\nu 1p$, Conditional Expression (1) is satisfied.

$$0.6376 < \theta gF1p + 0.0017 \times \nu 1p < 0.7 \quad (1)$$

In the zoom lens of the present invention, it is preferable to satisfy Conditional Expression (1-1).

$$0.6377 < \theta gF1p + 0.0017 \times \nu 1p < 0.644 \quad (1\text{-}1)$$

In the zoom lens of the present invention, assuming that an average of Abbe numbers of all positive lenses included in the first lens group at the d line is $\nu ave1p$, it is preferable to satisfy Conditional Expression (2), and it is more preferable to satisfy Conditional Expression (2-1).

$$76 < \nu ave1p < 93 \quad (2)$$

$$79 < \nu ave1p < 90 \quad (2\text{-}1)$$

In the zoom lens of the present invention, assuming that a refractive index of the most image side positive lens at the d line is $N1p$, it is preferable to satisfy Conditional Expression (3), and it is more preferable to satisfy Conditional Expression (3-1).

$$1.68 < N1p < 1.78 \quad (3)$$

$$1.69 < N1p < 1.77 \quad (3\text{-}1)$$

In the zoom lens of the present invention, it is preferable that a most object side negative lens having a negative refractive power is disposed to be closest to the object side in the first lens group. In this case, assuming that a focal length of the first lens group in a state where an object at infinity is in focus is $fG1$ and a focal length of the most object side negative lens is $f1n$, it is preferable to satisfy Conditional Expression (4), and it is more preferable to satisfy Conditional Expression (4-1).

$$-0.72 < fG1/f1n < -0.52 \quad (4)$$

$$-0.69 < fG1/f1n < -0.55 \quad (4\text{-}1)$$

In the zoom lens of the present invention, assuming that a focal length of the most image side positive lens is $f1p$ and a focal length of the first lens group in a state where an object at infinity is in focus is $fG1$, it is preferable to satisfy Conditional Expression (5), and it is more preferable to satisfy Conditional Expression (5-1).

$$2.2 < f1p/fG1 < 3.7 \quad (5)$$

$$2.5 < f1p/fG1 < 3.4 \quad (5\text{-}1)$$

In the zoom lens of the present invention, assuming that a focal length of the zoom lens at the telephoto end in a state where an object at infinity is in focus is $ft$ and a focal length of the first lens group in a state where an object at infinity is in focus is fG1, it is preferable to satisfy Conditional Expression (6).

$$2.2 < ft/fG1 < 3 \qquad (6)$$

The zoom lens of the present invention may be configured such that focusing is performed by moving a part of lenses in the first lens group.

The zoom lens of the present invention may be configured such that the first lens group consists of, in order from the object side to the image side, a first-a sub-lens group that remains stationary with respect to the image plane during focusing, a first-b sub-lens group that has a positive refractive power and moves toward the object side during focusing from an object at infinity to a close-range object, and a first-c sub-lens group that has a positive refractive power and moves toward the object side along a locus different from the first-b sub-lens group during focusing from the object at infinity to the close-range object. In this case, it is preferable that an average of refractive indexes of all positive lenses included in the first-c sub-lens group at the d line is greater than an average of refractive indexes of all positive lenses included in the first-b sub-lens group at the d line.

In the zoom lens of the present invention, it is preferable that the first lens group has three or more positive lenses.

The zoom lens of the present invention may be configured such that that the third lens group consists of, in order from the object side to the image side, a negative lens and a positive lens. In this case, assuming that an Abbe number of the negative lens of the third lens group at the d line is ν3n and an Abbe number of the positive lens of the third lens group at the d line is ν3p, it is preferable to satisfy Conditional Expression (7).

$$14 < \nu 3n - \nu 3p < 30 \qquad (7)$$

In the zoom lens of the present invention, it is preferable that the stop and the fourth lens group integrally move during zooming from the wide-angle end to the telephoto end.

An imaging apparatus of the present invention comprises the zoom lens of the present invention.

In the present description, it should be noted that the terms "consisting of ~" and "consists of ~" are used in a substantial sense, and mean that the imaging lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In addition, the term "~ group that has a positive refractive power" means that the group has a positive refractive power as a whole. Likewise, the term "~ group that has a negative refractive power" means that the group has a negative refractive power as a whole. The "lens group" and the "sub-lens group" each may be composed of a plurality of lens, or each may be composed of only one lens. Signs of refractive powers of the lens groups and signs of refractive powers of the lenses are assumed as those in paraxial regions in a case where some lenses have aspheric surfaces. All the above-mentioned conditional expressions are based on the d line (a wavelength of 587.56 nm (nanometers)).

It should be noted that the partial dispersion ratio θgF between the g line and the F line of a certain lens is defined by θgF=(Ng−NF)/(NF−NC), where the refractive indexes of the lens at the g line (a wavelength of 435.8 nm (nanometers)), F line (a wavelength of 486.1 nm (nanometers)), and C line (a wavelength of 656.3 nm (nanometers)) are Ng, NF, and NC, respectively.

According to the present invention, in the zoom lens having a five-group configuration, the sign of the refractive power of each lens group, the position of the stop, the behavior of each lens group and the stop during zooming, and the configuration of the first lens group are appropriately set, and predetermined conditional expressions are satisfied. Thereby, it is possible to provide a zoom lens, which has favorable performance since reduction in size and weight is achieved and various aberrations including chromatic aberration are satisfactorily corrected while a high zoom ratio is ensured, and an imaging apparatus comprising the zoom lens.

BRIEF DESCRIPTION OF THE DRAWINGS

FIG. 2 is a cross-sectional view illustrating a configuration and optical paths of the zoom lens of Example 1 of the present invention at the wide-angle end, the middle focal length state, and the telephoto end.

FIG. 7 is a diagram of aberrations of the zoom lens of Example 1 of the present invention.

FIG. 8 is a diagram of aberrations of the zoom lens of Example 2 of the present invention.

FIG. 9 is a diagram of aberrations of the zoom lens of Example 3 of the present invention.

FIG. 10 is a diagram of aberrations of the zoom lens of Example 4 of the present invention.

FIG. 11 is a diagram of aberrations of the zoom lens of Example 5 of the present invention.

DESCRIPTION OF THE PREFERRED EMBODIMENTS

Figure 1:
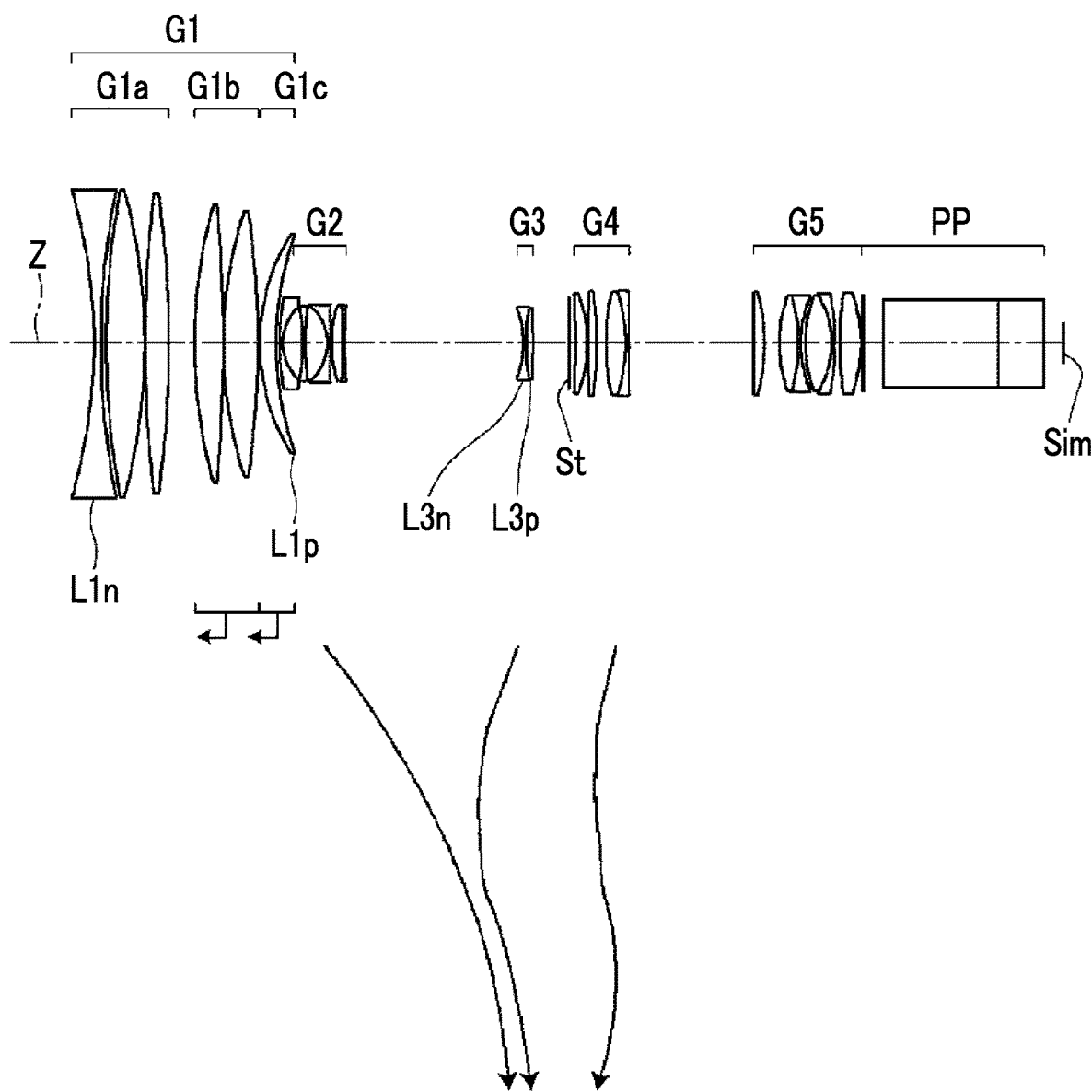
FIG. 1 is a cross-sectional view illustrating a lens configuration and a movement locus of a zoom lens of Example 1 of the present invention at the wide-angle end.

Hereinafter, embodiments of the present invention will be described with reference to drawings. FIG. 1 is a cross-sectional view illustrating a lens configuration of a zoom lens of an embodiment of the present invention at the wide-angle end. FIG. 2 is a cross-sectional view additionally illustrating optical paths of the zoom lens in the respective states. The examples shown in FIGS. 1 and 2 correspond to the zoom lens of Example 1 to be described later. FIGS. 1 and 2 each show a state where the object at infinity is in focus, where the left side of the drawing is the object side and the right side of the drawing is the image side.

In FIG. 2, the upper part labeled by "WIDE" shows the wide-angle end state, the middle part labeled by "MIDDLE"

shows the middle focal length state, and the lower part labeled by "TELE" shows the telephoto end state. Further, FIG. 2 shows rays including on-axis rays wa and rays with the maximum angle of view wb at the wide-angle end state, on-axis rays ma and rays with the maximum angle of view mb at the middle focal length state, and on-axis rays to and rays with the maximum angle of view tb at the telephoto end state.

Further, FIGS. 1 and 2 show an example in which an optical member PP having an incident surface and an exit surface parallel to each other is disposed between the zoom lens and the image plane Sim. The optical member PP is a member assumed to include various filters, a prism, a cover glass, and the like. Although the optical member PP in FIGS. 1 and 2 consists of three members, the number of members composing the optical member PP is not limited to that in FIG. 1, and the optical member PP may be omitted.

The zoom lens of the present embodiment consists of, in order from the object side to the image side along the optical axis Z, a first lens group G1 having a positive refractive power, a second lens group G2 having a negative refractive power, a third lens group G3 having a negative refractive power, an aperture stop St, a fourth lens group G4 having a positive refractive power, and a fifth lens group G5 having a positive refractive power. During zooming from the wide-angle end to the telephoto end, the first lens group G1 and the fifth lens group G5 remain stationary with respect to an image plane Sim, the second lens group G2, the third lens group G3, the aperture stop St, and the fourth lens group G4 move in the direction of the optical axis, and all the distances between adjacent lens groups in the direction of the optical axis changes. In FIG. 1, under each lens group moving during zooming, a movement locus of each lens group during zooming from the wide-angle end to the telephoto end is schematically indicated by an arrow.

By adopting the above-mentioned configuration, it is possible to shorten the total length of the lens system while ensuring a high zoom ratio. Separately from the second lens group G2 having a main zooming function, the image plane Sim can be corrected for zooming by moving the third lens group G3 during zooming, and further fluctuation in spherical aberration and fluctuation in field curvature during zooming can be corrected by moving the fourth lens group G4. The first lens group G1 occupying the most of the weight of the whole lens system remains stationary during zooming, whereby it is possible to reduce fluctuation in center of gravity of the lens system during zooming, and it is possible to improve convenience at the time of imaging. Further, the fifth lens group G5, which has the positive refractive power and remains stationary during zooming, is disposed to be closest to the image side. Thereby, it becomes easy for an extender, which is capable of extending the focal length of the whole system, to be detachably disposed in the vicinity of the fifth lens group G5.

By making the fourth lens group G4 as a lens group having a positive refractive power, the fourth lens group G4 and the fifth lens group G5 are able to share a positive refractive power, whereby it is possible to reduce spherical aberration. Further, by making the fourth lens group G4 as a lens group having a positive refractive power, it is possible to reduce the diameter of the lens of the fifth lens group G5.

By disposing the aperture stop St between the third lens group G3 and the fourth lens group G4, it is possible to minimize the radial height of off-axis rays in the first lens group G1 and the fourth lens group G4, and there is an advantage in size reduction and weight reduction. In addition, by moving the aperture stop St during zooming, it becomes possible to make the aperture stop St close to the first lens group G1 in the zoom range where the height of the off-axis principal ray is high. Thereby, it is possible to minimize the diameter of the lens of the first lens group G1, and there is an advantage in weight reduction.

It should be noted that the aperture stop St may be configured so as to move integrally with the fourth lens group G4 during zooming. In this case, it is possible to reduce fluctuation in F number during zooming.

The most image side positive lens L1$p$ having a positive refractive power is disposed to be closest to the image side in the first lens group G1. Assuming that a partial dispersion ratio of the most image side positive lens L1$p$ between a g line and an F line is θgF1$p$ and an Abbe number of the most image side positive lens L1$p$ at the d line is ν1$p$, the lens system is configured to satisfy Conditional Expression (1). By not allowing the result of Conditional Expression (1) to be equal to or less than the lower limit, it becomes easy to correct the secondary spectrum at the telephoto end. By not allowing the result of Conditional Expression (1) to be equal to or greater than the upper limit, it becomes easy to satisfactorily correct the secondary spectrum without over-correction. In addition, in a case of a configuration in which Conditional Expression (1-1) is satisfied, it is possible to obtain more favorable characteristics.

$$0.6376 < \theta gF1p + 0.0017 \times \nu 1p < 0.7 \tag{1}$$

$$0.6377 < \theta gF1p + 0.0017 \times \nu 1p < 0.644 \tag{1-1}$$

Assuming that a refractive index of the most image side positive lens L1$p$ at the d line is N1$p$, it is preferable to satisfy Conditional Expression (3). By not allowing the result of Conditional Expression (3) to be equal to or less than the lower limit, the most image side positive lens L1$p$ can be composed of a low dispersion material having a high refractive index. Thus, it becomes easy to satisfactorily correct various aberrations at the telephoto end while achieving reduction in size and a high zoom ratio. By not allowing the result of Conditional Expression (3) to be equal to or greater than the upper limit, it is possible to select a low dispersion material as the material of the most image side positive lens L1$p$, and there is an advantage in correction of chromatic aberration. In addition, in a case of a configuration in which Conditional Expression (3-1) is satisfied, it is possible to obtain more favorable characteristics.

$$1.68 < N1p < 1.78 \tag{3}$$

$$1.69 < N1p < 1.77 \tag{3-1}$$

Assuming that a focal length of the most image side positive lens L1$p$ is f1$p$ and a focal length of the first lens group G1 in a state where the object at infinity is in focus is fG1, it is preferable to satisfy Conditional Expression (5). By satisfying Conditional Expression (5), it becomes easy to satisfactorily correct longitudinal chromatic aberration and lateral chromatic aberration while properly correcting spherical aberration at the telephoto end. In addition, in a case of a configuration in which Conditional Expression (5-1) is satisfied, it is possible to obtain more favorable characteristics.

$$2.2 < f1p/fG1 < 3.7 \tag{5}$$

$$2.5 < f1p/fG1 < 3.4 \tag{5-1}$$

In addition, it is preferable that the first lens group G1 has three or more positive lenses. In such a case, it is possible to suppress remarkable occurrence of spherical aberration and astigmatism.

Assuming that an average of Abbe numbers of all positive lenses included in the first lens group G1 at the d line is vave1p, it is preferable to satisfy Conditional Expression (2). By satisfying Conditional Expression (2), it is suitable for suppressing lateral chromatic aberration in a well-balanced manner while suppressing longitudinal chromatic aberration on the blue side. In addition, in a case of a configuration in which Conditional Expression (2-1) is satisfied, it is possible to obtain more favorable characteristics.

$$76 < vave1p < 93 \quad (2)$$

$$79 < vave1p < 90 \quad (2\text{-}1)$$

It is preferable that a most object side negative lens L1n having a negative refractive power is disposed to be closest to the object side in the first lens group G1. In such a case, it is possible to minimize the angle of incidence of off-axis rays into the lens closer to the image side than the most object side negative lens L1n, and there is an advantage in widening the angle.

Assuming that a focal length of the first lens group G1 in a state where the object at infinity is in focus is fG1 and a focal length of the most object side negative lens L1n is f1n, it is preferable to satisfy Conditional Expression (4). By not allowing the result of Conditional Expression (4) to be equal to or less than the lower limit, it is possible to suppress occurrence of spherical aberration. By not allowing the result of Conditional Expression (4) to be equal to or greater than the upper limit, it becomes easy to minimize the angle of incidence of off-axis rays into the lens closer to the image side than the most object side negative lens L1n, and there is an advantage in widening the angle. In addition, in a case of a configuration in which Conditional Expression (4-1) is satisfied, it is possible to obtain more favorable characteristics.

$$-0.72 < fG1/f1n < -0.52 \quad (4)$$

$$-0.69 < fG1/f1n < -0.55 \quad (4\text{-}1)$$

Assuming that a focal length of the zoom lens at the telephoto end in a state where the object at infinity is in focus is ft and a focal length of the first lens group G1 in a state where the object at infinity is in focus is fG1, it is preferable to satisfy Conditional Expression (6). By satisfying Conditional Expression (6), it is possible to satisfactorily correct various aberrations while achieving reduction in size and a high zoom ratio. In addition, in a case of a configuration in which Conditional Expression (6-1) is satisfied, it is possible to obtain more favorable characteristics.

$$2.2 < ft/fG1 < 3 \quad (6)$$

$$2.3 < ft/fG1 < 2.9 \quad (6\text{-}1)$$

It is preferable that the zoom lens is configured so as to perform focusing by moving a part of lenses in the first lens group G1 as focusing lenses. In such a case, it is possible to reduce the difference caused by the zoom state of the amount of movement of the focusing lens, and it is possible to obtain high convenience at the time of imaging. Further, in a case where only some lenses in the first lens group G1 are used as focusing lenses, as compared with a case where all the lenses in the first lens group G1 are used as focusing lenses, it is possible to reduce the load on the driving system.

For example, in a manner similar to the example of FIG. 1, the first lens group G1 may be configured to consist of, in order from the object side to the image side, a first-a sub-lens group G1a that remains stationary with respect to the image plane Sim during focusing, a first-b sub-lens group G1b that has a positive refractive power and moves toward the object side during focusing from the object at infinity to the close-range object, and a first-c sub-lens group G1c that has a positive refractive power and moves toward the object side along a locus different from the first-b sub-lens group G1b during focusing from the object at infinity to the close-range object. That is, in the example of FIG. 1, the floating focus method is adopted in which the first-b sub-lens group G1b and the first-c sub-lens group G1c are moved to the object side with distances different from each other during focusing. By making the first lens group G1 with the above configuration for focusing, fluctuations in field curvature and spherical aberration caused by the object distance can be suppressed. Arrows, which are directed toward the object side in the horizontal direction and are shown below the first-b sub-lens group G1b and the first-c sub-lens group G1c in FIG. 1, indicate that these two sub-lens groups move toward the object side during focusing from the object at infinity to the close-range object.

In a case where the first lens group G1 consists of the three sub-lens groups, it is preferable that an average of refractive indexes of all positive lenses included in the first-c sub-lens group G1c at the d line is greater than an average of refractive indexes of all positive lenses included in the first-b sub-lens group G1b at the d line. In such a case, it is possible to suppress fluctuation in field curvature caused by the object distance. In the case where the sub-lens group includes only one positive lens, the above term "the average of refractive indexes of all positive lenses included in the ~sub-lens group~ at the d line" is a refractive index of the positive lens included in the sub-lens group at the d line.

In the example of FIG. 1, the first lens group G1 is composed of six lenses, and the number of lenses is advantageous for compatibility between high performance and light weight. In the example of FIG. 1, the first-a sub-lens group G1a consists of three lenses including, in order from the object side to the image side, a biconcave lens, a biconvex lens, and a positive lens convex toward the image side. Occurrence of high order spherical aberration on the telephoto side can be suppressed by the biconcave lens closest to the object side. In a case where the shape of the second and third lenses from the object side is configured as described above, distortion at the wide angle end can be corrected. It should be noted that the term "high order" described herein means 5th or more order.

In the example of FIG. 1, regarding the two sub-lens groups used for the floating focus, the first-b sub sub-lens group G1b is configured to consist of two positive lenses, and the first-c sub-lens group G1c is configured to consist of one positive lens.

For reduction in size of the sub-lens group moving during focusing, it is preferable to minimize the amount of movement thereof during focusing. Therefore, a certain degree of refractive power is necessary. However, in a case where one lens has a strong refractive power, spherical aberration increases. Thus, it is preferable that the refractive power is shared among a plurality of lenses. From the above situation, the first-b sub-lens group G1b is configured to consist of two positive lenses. On the other hand, in a case where the first-c sub-lens group G1c has a function different from that of the first-b sub-lens group G1b, for example, a function of maintaining favorable balance, the first-c sub-lens group G1c is configured to consist of one positive lens. In such a case, there is an advantage in reduction in weight.

The first-b sub-lens group G1b in the example of FIG. 1 consists of two biconvex lenses. Thereby, fluctuation in spherical aberration during focusing can be suppressed. The first-c sub-lens group G1c in the example of FIG. 1 consists of one positive meniscus lens convex toward the object side. Thereby, it is possible to suppress occurrence of spherical aberration on the telephoto side while achieving reduction in size.

In a manner similar to the example of FIG. 1, it is preferable that the third lens group G3 consists of, in order from the object side to the image side, a negative lens L3n and a positive lens L3p. Since the third lens group G3 tends to be disposed in the middle of the divergent light, in a case where the lenses are arranged in this order, it is possible to suppress occurrence of spherical aberration and astigmatism. At that time, in a case where the third lens group G3 is configured to consist of, in order from the object side to the image side, a biconcave lens and a positive lens convex toward the object side, it is possible to satisfactorily suppress occurrence of spherical aberration and astigmatism. Further, by adopting a configuration in which the third lens group G3 moving during zooming consists of two lenses including a negative lens and a positive lens, there is an advantage in achieving both favorable aberration correction and reduction in weight.

In a case where the third lens group G3 consists of, in order from the object side to the image side, the negative lens L3n and the positive lens L3p, assuming that an Abbe number of the negative lens L3n of the third lens group G3 at the d line is ν3n and an Abbe number of the positive lens L3p of the third lens group G3 at the d line is ν3p, it is preferable to satisfy Conditional Expression (7). By not allowing the result of Conditional Expression (7) to be equal to or less than the lower limit, there is an advantage in correcting longitudinal chromatic aberration on the wide-angle side. By not allowing the result of Conditional Expression (7) to be equal to or greater than the upper limit, there is an advantage in correcting longitudinal chromatic aberration on the telephoto side. In addition, in a case of a configuration in which Conditional Expression (7-1) is satisfied, it is possible to obtain more favorable characteristics.

$$14 < \nu 3n - \nu 3p < 30 \quad (7)$$

$$18 < \nu 3n - \nu 3p < 26 \quad (7\text{-}1)$$

The above-mentioned preferred configurations and available configurations may be arbitrary combinations, and it is preferable to selectively adopt the configurations in accordance with required specification. According to the present embodiment, it is possible to realize a zoom lens which has favorable performance since reduction in size and weight is achieved and various aberrations including chromatic aberration are satisfactorily corrected while a high zoom ratio is ensured. The "high zoom ratio" described herein means a zoom ratio of 20 times or more.

Next, numerical examples of the zoom lens of the present invention will be described.

EXAMPLE 1

FIGS. 1 and 2 are cross-sectional views of a zoom lens of Example 1, and an illustration method thereof is as described above. Therefore, repeated description is partially omitted herein. The zoom lens of Example 1 consists of, in order from the object side to the image side, a first lens group G1 having a positive refractive power, a second lens group G2 having a negative refractive power, a third lens group G3 having a negative refractive power, an aperture stop St, a fourth lens group G4 having a positive refractive power, and a fifth lens group G5 having a positive refractive power.

During zooming, the first lens group G1 and the fifth lens group G5 remain stationary with respect to the image plane Sim, the other lens groups move such that distances between lens groups adjacent to each other in the direction of the optical axis change, and the aperture stop St moves integrally with the fourth lens group G4. The first lens group G1 consists of, in order from the object side to the image side, a first-a sub-lens group G1a that remains stationary with respect to the image plane Sim during focusing, a first-b sub-lens group G1b that has a positive refractive power and moves toward the object side during focusing from the object at infinity to the close-range object, and a first-c sub-lens group G1c that has a positive refractive power and moves toward the object side along a locus different from the first-b sub-lens group G1b during focusing from the object at infinity to the close-range object. The first-a sub-lens group G1a consists of three lenses including first to third lenses from the object side in the first lens group G1. The first-b sub-lens group G1b consists of two lenses including fourth to fifth lenses from the object side in the first lens group G1. The first-c sub-lens group G1c consists of one lens including the lens closest to the image side in the first lens group G1, that is, the most image side positive lens L1p. The outline of the zoom lens of Example 1 has been described above.

Table 1 shows basic lens data of the zoom lens of Example 1, Table 2 shows variable surface distances, and Table 3 shows aspheric surface coefficients thereof. In Table 1, the column of the surface number shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. Further, the column of Nd shows a refractive index of each constituent element at the d line (a wavelength of 587.6 nm (nanometers)), the column of νd shows an Abbe number of each constituent element at the d line, and the column of θgF shows a partial dispersion ratio of each constituent element between the g line (a wavelength of 435.8 nm (nanometers)) and the F line (a wavelength of 486.1 nm (nanometers)).

In Table 1, reference signs of radii of curvature of surface shapes convex toward the object side are set to be positive, and reference signs of radii of curvature of surface shapes convex toward the image side are set to be negative. Table 1 additionally shows the aperture stop St and the optical member PP. In Table 1, in a place of a surface number of a surface corresponding to the aperture stop St, the surface number and a term of (St) are noted. A value at the bottom place of D in Table 1 indicates a distance between the image plane Sim and the surface closest to the image side in the table. In Table 1, the variable surface distances during zooming are referenced by the reference signs DD[ ], and are written into places of D, where object side surface numbers of distances are noted in [ ].

In the range of Table 2, values of the zoom ratio Zr, the focal length f, the F number FNo., the maximum total angle of view 2ω, and the variable surface distance are based on the d line. (°) in the place of 2ω indicates that the unit thereof is a degree. In Table 2, values in the wide-angle end state, the middle focal length state, and the telephoto end state are respectively shown in the columns labeled by WIDE, MIDDLE, and TELE. The values of Tables 1 and 2 are values in a state where the object at infinity is in focus.

In Table 1, the reference sign * is attached to surface numbers of aspheric surfaces, and numerical values of the paraxial radius of curvature are written into the column of the radius of curvature of the aspheric surface. Table 3 shows surface numbers of the aspheric surfaces, and aspheric surface coefficients of the respective aspheric surfaces. The "E±n" (n: an integer) in numerical values of the aspheric surface coefficients of Table 3 indicates "×10$^{±n}$". The aspheric surface coefficients are values of the coefficients KA and Am (m=4, 6, 8, . . . ) in aspheric surface expression represented as the following expression.

$$Zd = C \times h^2 / \{1 + (1 - KA \times C^2 \times h^2)^{1/2}\} + \Sigma Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is a paraxial curvature, KA and Am are aspheric surface coefficients, and Σ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Surface Number | R | D | Nd | νd | θgF |
|---|---|---|---|---|---|
| 1 | −156.5642 | 2.0000 | 1.80610 | 33.27 | 0.58845 |
| 2 | 221.8878 | 1.4810 | | | |
| 3 | 237.5318 | 11.0700 | 1.43387 | 95.18 | 0.53733 |
| 4 | −168.4311 | 0.1200 | | | |
| 5 | 373.9522 | 6.9200 | 1.43700 | 95.10 | 0.53364 |
| *6 | −275.4858 | 7.2500 | | | |
| 7 | 148.6414 | 8.1400 | 1.43387 | 95.18 | 0.53733 |
| 8 | −485.0637 | 0.1200 | | | |
| 9 | 123.3806 | 9.8700 | 1.43700 | 95.10 | 0.53364 |
| 10 | −263.3672 | 0.6000 | | | |
| 11 | 58.4570 | 4.7900 | 1.76385 | 48.49 | 0.55898 |
| 12 | 93.6571 | DD[12] | | | |
| *13 | 79.8915 | 0.9000 | 2.00100 | 29.13 | 0.59952 |
| 14 | 14.3878 | 5.7329 | | | |
| 15 | −47.2697 | 0.7100 | 1.84850 | 43.79 | 0.56197 |
| 16 | 105.2970 | 6.2900 | 1.85896 | 22.73 | 0.62844 |
| 17 | −14.2140 | 0.7400 | 1.95375 | 32.32 | 0.59015 |
| 18 | 317.8607 | 0.4872 | | | |
| 19 | 38.0295 | 3.1400 | 1.80518 | 25.46 | 0.61572 |
| 20 | −160.7230 | 0.7400 | 1.80420 | 46.50 | 0.55727 |
| 21 | 196.7237 | DD[21] | | | |
| 22 | −28.7380 | 0.7500 | 1.83400 | 37.34 | 0.57908 |
| 23 | 60.1740 | 2.0500 | 1.98613 | 16.48 | 0.66558 |
| 24 | −450.7975 | DD[24] | | | |
| 25(St) | ∞ | 1.9801 | | | |
| 26 | −361.5323 | 3.4300 | 1.56883 | 56.04 | 0.54853 |
| 27 | −39.9807 | 0.1200 | | | |
| 28 | 224.9682 | 2.5900 | 1.72342 | 37.95 | 0.58370 |
| 29 | −108.9684 | 2.5420 | | | |
| 30 | 60.6005 | 5.7500 | 1.51633 | 64.14 | 0.53531 |
| 31 | −46.0820 | 0.9200 | 1.95375 | 32.32 | 0.59015 |
| 32 | −820.4566 | DD[32] | | | |
| 33 | 844.6006 | 3.0800 | 1.73800 | 32.33 | 0.59005 |
| 34 | −59.1866 | 4.3224 | | | |
| 35 | 41.4810 | 5.4400 | 1.48749 | 70.24 | 0.53007 |
| 36 | −49.5070 | 0.8600 | 1.95375 | 32.32 | 0.59015 |
| 37 | 33.8525 | 1.3423 | | | |
| 38 | 40.1704 | 7.5000 | 1.53775 | 74.70 | 0.53936 |
| 39 | −26.6590 | 0.8800 | 1.87070 | 40.73 | 0.56825 |

TABLE 1-continued

Example 1

| Surface Number | R | D | Nd | νd | θgF |
|---|---|---|---|---|---|
| 40 | −80.5818 | 1.2443 | | | |
| 41 | 76.6845 | 6.2386 | 1.58144 | 40.75 | 0.57757 |
| 42 | −43.9672 | 0.2000 | | | |
| 43 | ∞ | 1.0000 | 1.52780 | 58.67 | 0.55390 |
| 44 | ∞ | 5.0654 | | | |
| 45 | ∞ | 33.0000 | 1.60859 | 46.44 | 0.56664 |
| 46 | ∞ | 13.2000 | 1.51633 | 64.05 | 0.53463 |
| 47 | ∞ | 5.5015 | | | |

TABLE 2

Example 1

| | WIDE | MIDDLE | TELE |
|---|---|---|---|
| Zr | 1.0 | 7.4 | 23.1 |
| f | 8.09 | 59.72 | 186.99 |
| FNo. | 1.86 | 1.86 | 2.96 |
| 2ω(°) | 75.0 | 10.4 | 3.4 |
| DD[12] | 1.04 | 44.12 | 52.51 |
| DD[21] | 50.98 | 2.65 | 2.76 |
| DD[24] | 10.00 | 14.19 | 1.29 |
| DD[32] | 35.65 | 36.72 | 41.11 |

TABLE 3

Example 1

| Surface Number | 6 | 13 |
|---|---|---|
| KA | 1.0000000E+00 | 1.0000000E+00 |
| A4 | 1.0052940E−07 | 4.8215119E−06 |
| A6 | 5.2398512E−11 | −2.3658343E−08 |
| A8 | −1.7512379E−13 | 6.0301433E−10 |
| A10 | 3.7976355E−16 | −1.7465769E−11 |
| A12 | −4.8613057E−19 | 3.4211689E−13 |
| A14 | 3.8205957E−22 | −3.8654089E−15 |
| A16 | −1.8037912E−25 | 2.4363541E−17 |
| A18 | 4.6844462E−29 | −7.9838847E−20 |
| A20 | −5.1369470E−33 | 1.0592695E−22 |

FIG. 7 shows, in order from the left, aberration diagrams of the zoom lens of Example 1 in a state where the object at the infinity is brought into focus. In FIG. 7, in order from the left side, spherical aberration, astigmatism, distortion, and lateral chromatic aberration are shown. In FIG. 7, the upper part labeled by WIDE shows the zoom lens in the wide-angle end state, the middle part labeled by MIDDLE shows the zoom lens in the middle focal length state, the lower part labeled by TELE shows the zoom lens in the telephoto end state. In the spherical aberration diagram, aberrations at the d line (a wavelength of 587.6 nm (nanometers)), the C line (a wavelength of 656.3 nm (nanometers)), the F line (a wavelength of 486.1 nm (nanometers)), and the g line (a wavelength of 435.8 nm (nanometers)) are respectively indicated by the solid line, the long dashed line, the short dashed line, and the gray solid line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line, the F line, and the g line are respectively indicated by the long dashed line, the short dashed line, and the gray solid line. In the spherical aberration diagram, FNo. indicates an F number. In the other aberration diagrams, ω indicates a half angle of view.

In the description of Example 1, reference signs, meanings, and description methods of the respective data pieces are the same as those in the following examples unless otherwise noted. Therefore, in the following description, repeated description will be omitted.

EXAMPLE 2

Figure 3:
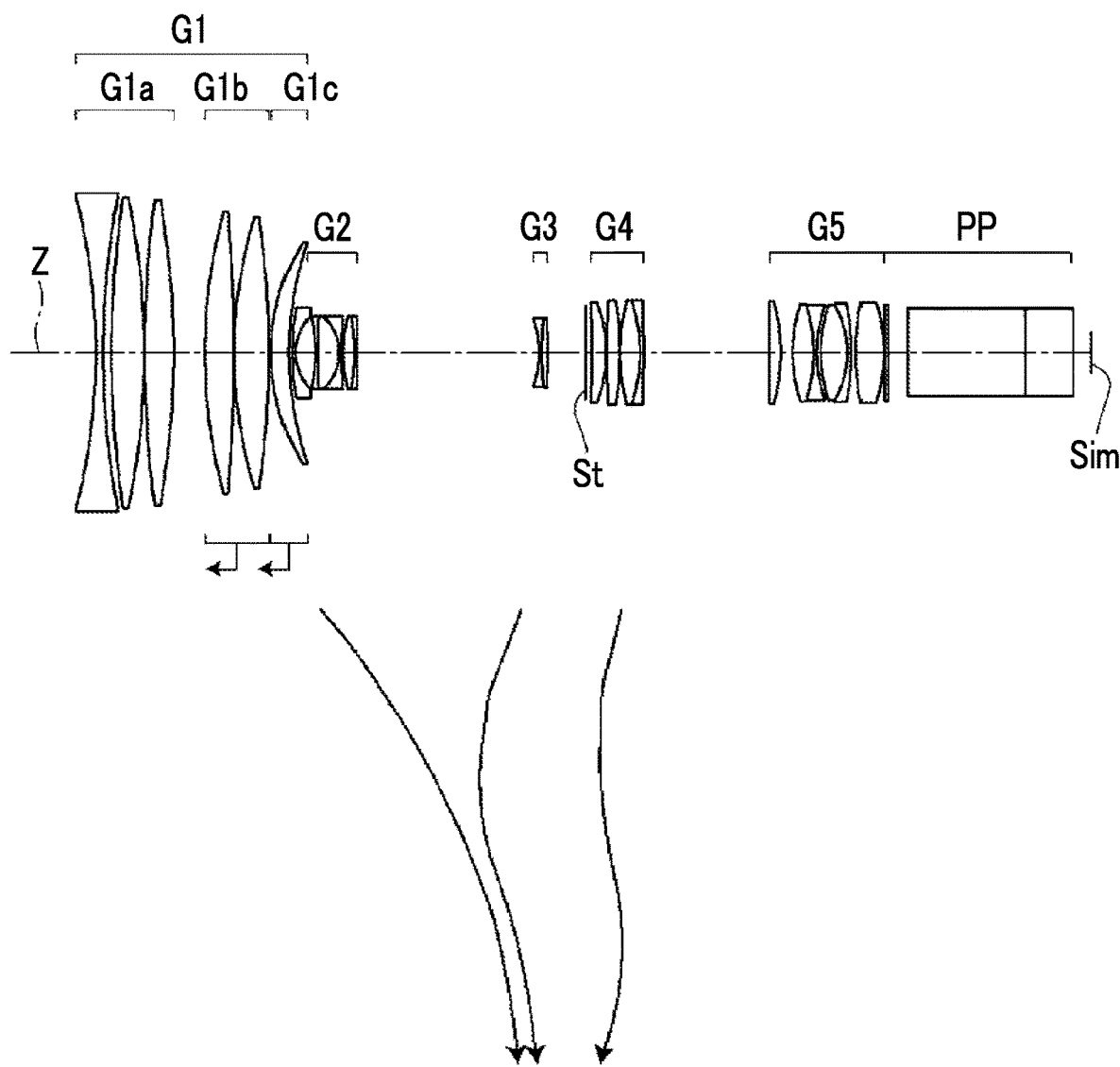
FIG. 3 is a cross-sectional view illustrating a lens configuration and a movement locus of a zoom lens of Example 2 of the present invention at the wide-angle end.

FIG. 3 is a cross-sectional view of a zoom lens of Example 2. The zoom lens of Example 2 has the same configuration as the outline of the zoom lens of Example 1. Table 4 shows basic lens data of the zoom lens of Example 2, Table 5 shows specification and variable surface distances, Table 6 shows aspheric surface coefficients, and FIG. 8 shows aberration diagrams in a state where the object at infinity is in focus.

TABLE 4

Example 2

| Surface Number | R | D | Nd | vd | θgF |
|---|---|---|---|---|---|
| 1 | −174.7858 | 2.0000 | 1.85026 | 32.35 | 0.59472 |
| 2 | 227.3024 | 2.4601 | | | |
| 3 | 300.0679 | 9.0908 | 1.43387 | 95.18 | 0.53733 |
| 4 | −212.9319 | 0.1200 | | | |
| 5 | 325.5049 | 8.1638 | 1.43700 | 95.10 | 0.53364 |
| *6 | −220.6288 | 8.6400 | | | |
| 7 | 148.8907 | 8.1140 | 1.43387 | 95.18 | 0.53733 |
| 8 | −476.7720 | 0.1200 | | | |
| 9 | 129.7069 | 9.6933 | 1.43700 | 95.10 | 0.53364 |
| 10 | −254.7477 | 0.6000 | | | |
| 11 | 58.3491 | 4.8717 | 1.76385 | 48.49 | 0.55898 |
| 12 | 94.5804 | DD[12] | | | |
| *13 | 76.0439 | 0.9000 | 2.05090 | 26.94 | 0.60519 |
| 14 | 14.6177 | 5.4703 | | | |
| 15 | −46.8489 | 0.7450 | 1.81600 | 46.62 | 0.55682 |
| 16 | 144.7209 | 6.0061 | 1.85896 | 22.73 | 0.62844 |
| 17 | −13.7156 | 0.7349 | 1.95375 | 32.32 | 0.59015 |
| 18 | 290.5042 | 0.3426 | | | |
| 19 | 38.2754 | 3.0176 | 1.78472 | 25.68 | 0.61621 |
| 20 | −79.8457 | 0.7448 | 1.77250 | 49.60 | 0.55212 |
| 21 | 461.6169 | DD[21] | | | |
| 22 | −28.5250 | 0.7450 | 1.85150 | 40.78 | 0.56958 |
| 23 | 69.6887 | 1.6485 | 1.98613 | 16.48 | 0.66558 |
| 24 | −307.3528 | DD[24] | | | |
| 25(St) | ∞ | 1.9433 | | | |
| 26 | −372.2727 | 3.9538 | 1.58267 | 46.42 | 0.56716 |
| 27 | −37.9499 | 0.1200 | | | |
| 28 | 260.6396 | 3.6095 | 1.61293 | 37.00 | 0.58632 |
| 29 | −103.9810 | 0.1200 | | | |
| 30 | 56.5504 | 5.6090 | 1.51633 | 64.14 | 0.53531 |
| 31 | −45.3230 | 0.9000 | 1.95375 | 32.32 | 0.59015 |
| 32 | −796.3832 | DD[32] | | | |
| 33 | 3908.5091 | 3.1934 | 1.67270 | 32.10 | 0.59891 |
| 34 | −52.0742 | 3.3455 | | | |
| 35 | 45.5410 | 5.7622 | 1.48749 | 70.24 | 0.53007 |
| 36 | −45.5577 | 0.9000 | 1.95375 | 32.32 | 0.59015 |
| 37 | 35.6670 | 1.2777 | | | |
| 38 | 41.2999 | 7.4416 | 1.53775 | 74.70 | 0.53936 |
| 39 | −26.8351 | 1.1358 | 1.87070 | 40.73 | 0.56825 |
| 40 | −67.5322 | 1.2004 | | | |
| 41 | 73.8935 | 7.6133 | 1.54814 | 45.78 | 0.56859 |
| 42 | −45.5621 | 0.2000 | | | |
| 43 | ∞ | 1.0000 | 1.52780 | 58.67 | 0.55390 |
| 44 | ∞ | 5.4189 | | | |
| 45 | ∞ | 33.0000 | 1.60859 | 46.44 | 0.56664 |
| 46 | ∞ | 13.2000 | 1.51633 | 64.05 | 0.53463 |
| 47 | ∞ | 5.0241 | | | |

TABLE 5

Example 2

| | WIDE | MIDDLE | TELE |
|---|---|---|---|
| Zr | 1.0 | 7.4 | 23.1 |
| f | 8.09 | 59.71 | 186.97 |
| FNo. | 1.87 | 1.87 | 3.00 |
| 2ω(°) | 75.0 | 10.4 | 3.4 |
| DD[12] | 0.95 | 44.77 | 53.31 |
| DD[21] | 50.96 | 2.50 | 2.23 |
| DD[24] | 10.66 | 14.46 | 1.22 |
| DD[32] | 35.23 | 36.08 | 41.05 |

TABLE 6

Example 2

| Surface Number | 6 | 13 |
|---|---|---|
| KA | 1.0000000E+00 | 1.0000000E+00 |
| A4 | 1.0273724E−07 | 4.6625688E−06 |
| A6 | 2.7307824E−11 | −1.4780983E−08 |
| A8 | −7.3425543E−14 | 2.2859284E−10 |
| A10 | 1.6502042E−16 | −7.0454738E−12 |
| A12 | −2.2720607E−19 | 1.5874656E−13 |
| A14 | 1.9670710E−22 | −1.9160039E−15 |
| A16 | −1.0191553E−25 | 1.2380204E−17 |
| A18 | 2.8430201E−29 | −4.0775921E−20 |
| A20 | −3.2498244E−33 | 5.3708373E−23 |

EXAMPLE 3

Figure 4:
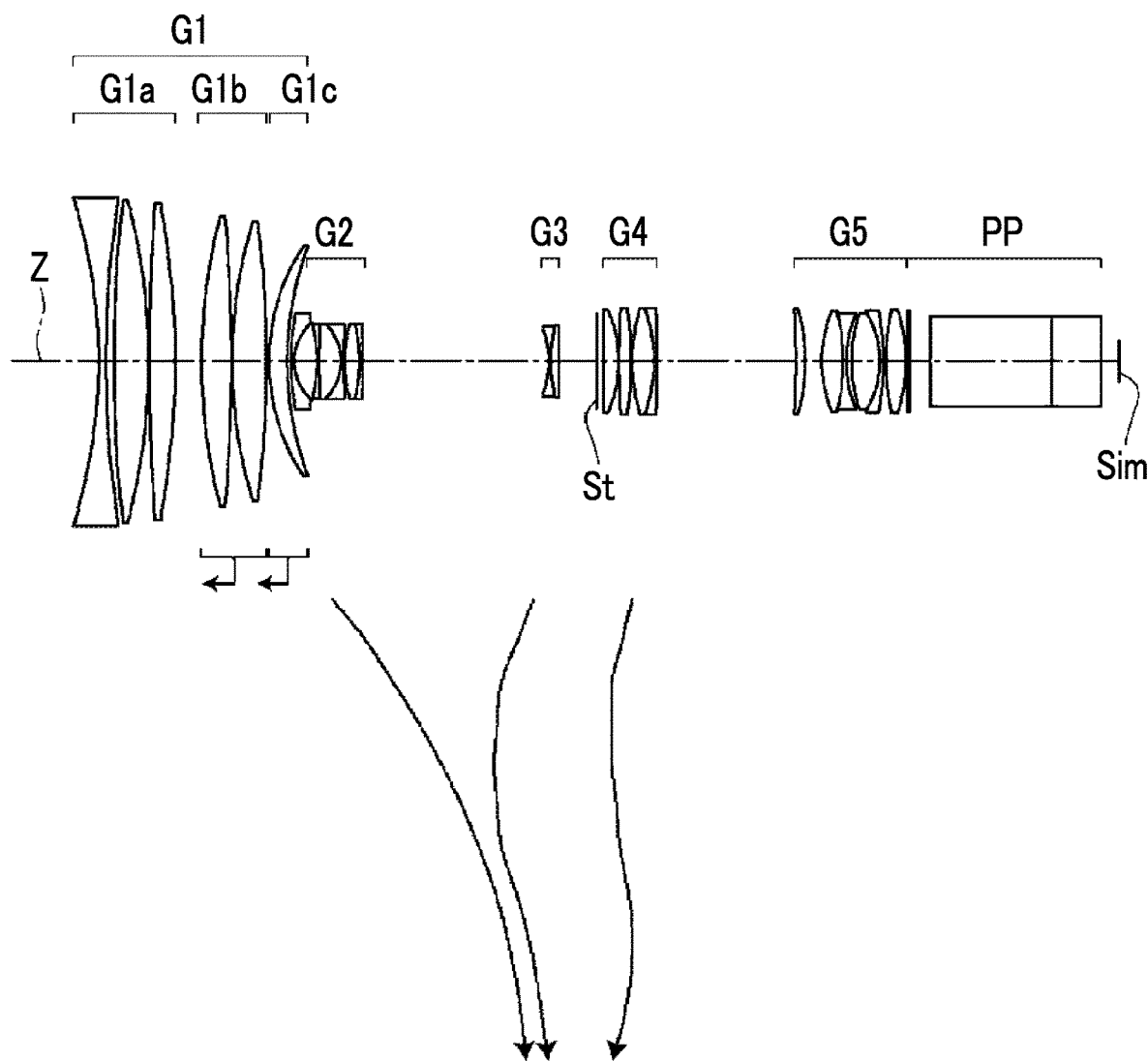
FIG. 4 is a cross-sectional view illustrating a lens configuration and a movement locus of a zoom lens of Example 3 of the present invention at the wide-angle end.

FIG. 4 is a cross-sectional view of a zoom lens of Example 3. The zoom lens of Example 3 has the same configuration as the outline of the zoom lens of Example 1. Table 7 shows basic lens data of the zoom lens of Example 3, Table 8 shows specification and variable surface distances, Table 9 shows aspheric surface coefficients, and FIG. 9 shows aberration diagrams in a state where the object at infinity is in focus.

TABLE 7

Example 3

| Surface Number | R | D | Nd | vd | θgF |
|---|---|---|---|---|---|
| 1 | −147.1236 | 2.0000 | 1.80610 | 33.27 | 0.58845 |
| 2 | 278.5048 | 2.1521 | | | |
| 3 | 387.4288 | 9.4880 | 1.43387 | 95.18 | 0.53733 |
| 4 | −167.9811 | 0.1198 | | | |
| 5 | 554.3675 | 7.0291 | 1.43875 | 94.66 | 0.53402 |
| *6 | −218.1145 | 7.2300 | | | |
| 7 | 155.4293 | 8.1172 | 1.43387 | 95.18 | 0.53733 |
| 8 | −430.4386 | 0.1198 | | | |
| 9 | 128.8853 | 9.3986 | 1.49700 | 81.54 | 0.53748 |
| 10 | −298.3301 | 0.6600 | | | |
| 11 | 55.6836 | 5.1233 | 1.69560 | 59.05 | 0.54348 |
| 12 | 89.3508 | DD[12] | | | |
| *13 | 75.9443 | 0.9000 | 2.00100 | 29.13 | 0.59952 |
| 14 | 14.3991 | 6.0832 | | | |
| 15 | −44.7652 | 0.7448 | 1.77250 | 49.60 | 0.55212 |
| 16 | 284.3422 | 5.8725 | 1.84666 | 23.78 | 0.61923 |
| 17 | −14.4696 | 0.7404 | 1.95375 | 32.32 | 0.59015 |
| 18 | 488.0163 | 0.1793 | | | |
| 19 | 37.1443 | 4.0739 | 1.78472 | 25.68 | 0.61621 |
| 20 | −46.7604 | 0.7456 | 1.78800 | 47.37 | 0.55598 |
| 21 | 185.3823 | DD[21] | | | |
| 22 | −27.7038 | 0.7449 | 1.83400 | 37.34 | 0.57908 |
| 23 | 57.3481 | 2.1955 | 1.98613 | 16.48 | 0.66558 |
| 24 | −531.9320 | DD[24] | | | |

TABLE 7-continued

Example 3

| Surface Number | R | D | Nd | vd | θgF |
|---|---|---|---|---|---|
| 25(St) | ∞ | 1.9969 | | | |
| 26 | −296.7036 | 3.9125 | 1.56883 | 56.04 | 0.54853 |
| 27 | −34.9549 | 0.1198 | | | |
| 28 | 231.2570 | 3.1232 | 1.62588 | 35.70 | 0.58935 |
| 29 | −121.3377 | 0.5196 | | | |
| 30 | 53.4071 | 5.7583 | 1.51633 | 64.14 | 0.53531 |
| 31 | −44.8739 | 0.9200 | 1.95375 | 32.32 | 0.59015 |
| 32 | −850.7767 | DD[32] | | | |
| 33 | −209.3349 | 2.5934 | 1.80000 | 29.84 | 0.60178 |
| 34 | −51.7592 | 4.5073 | | | |
| 35 | 36.6129 | 5.9337 | 1.48749 | 70.24 | 0.53007 |
| 36 | −50.9183 | 0.9000 | 1.95375 | 32.32 | 0.59015 |
| 37 | 33.7938 | 1.3710 | | | |
| 38 | 40.6312 | 7.7312 | 1.53775 | 74.70 | 0.53936 |
| 39 | −25.6514 | 0.9000 | 1.87070 | 40.73 | 0.56825 |
| 40 | −83.2336 | 0.8172 | | | |
| 41 | 72.2110 | 5.3611 | 1.58144 | 40.75 | 0.57757 |
| 42 | −43.9101 | 0.2000 | | | |
| 43 | ∞ | 1.0000 | 1.52780 | 58.67 | 0.55390 |
| 44 | ∞ | 5.4189 | | | |
| 45 | ∞ | 33.0000 | 1.60859 | 46.44 | 0.56664 |
| 46 | ∞ | 13.2000 | 1.51633 | 64.05 | 0.53463 |
| 47 | ∞ | 4.9162 | | | |

TABLE 8

Example 3

| | WIDE | MIDDLE | TELE |
|---|---|---|---|
| Zr | 1.0 | 7.4 | 23.1 |
| f | 8.09 | 59.71 | 186.98 |
| FNo. | 1.87 | 1.87 | 2.96 |
| 2ω(°) | 75.0 | 10.4 | 3.4 |
| DD[12] | 1.00 | 44.03 | 52.46 |
| DD[21] | 50.59 | 2.74 | 2.55 |
| DD[24] | 10.05 | 13.74 | 1.30 |
| DD[32] | 37.62 | 38.76 | 42.95 |

TABLE 9

Example 3

| Surface Number | 6 | 13 |
|---|---|---|
| KA | 1.0000000E+00 | 1.0000000E+00 |
| A4 | 8.9219056E−08 | 5.7396812E−06 |
| A6 | 6.6953452E−11 | −7.0188372E−08 |
| A8 | −2.9435733E−13 | 2.1603984E−09 |
| A10 | 7.1478167E−16 | −4.5260511E−11 |
| A12 | −9.8304139E−19 | 6.0752166E−13 |
| A14 | 8.0651728E−22 | −5.1025243E−15 |
| A16 | −3.8945307E−25 | 2.5840364E−17 |
| A18 | 1.0175328E−28 | −7.2135977E−20 |
| A20 | −1.1049544E−32 | 8.5197082E−23 |

EXAMPLE 4

Figure 5:
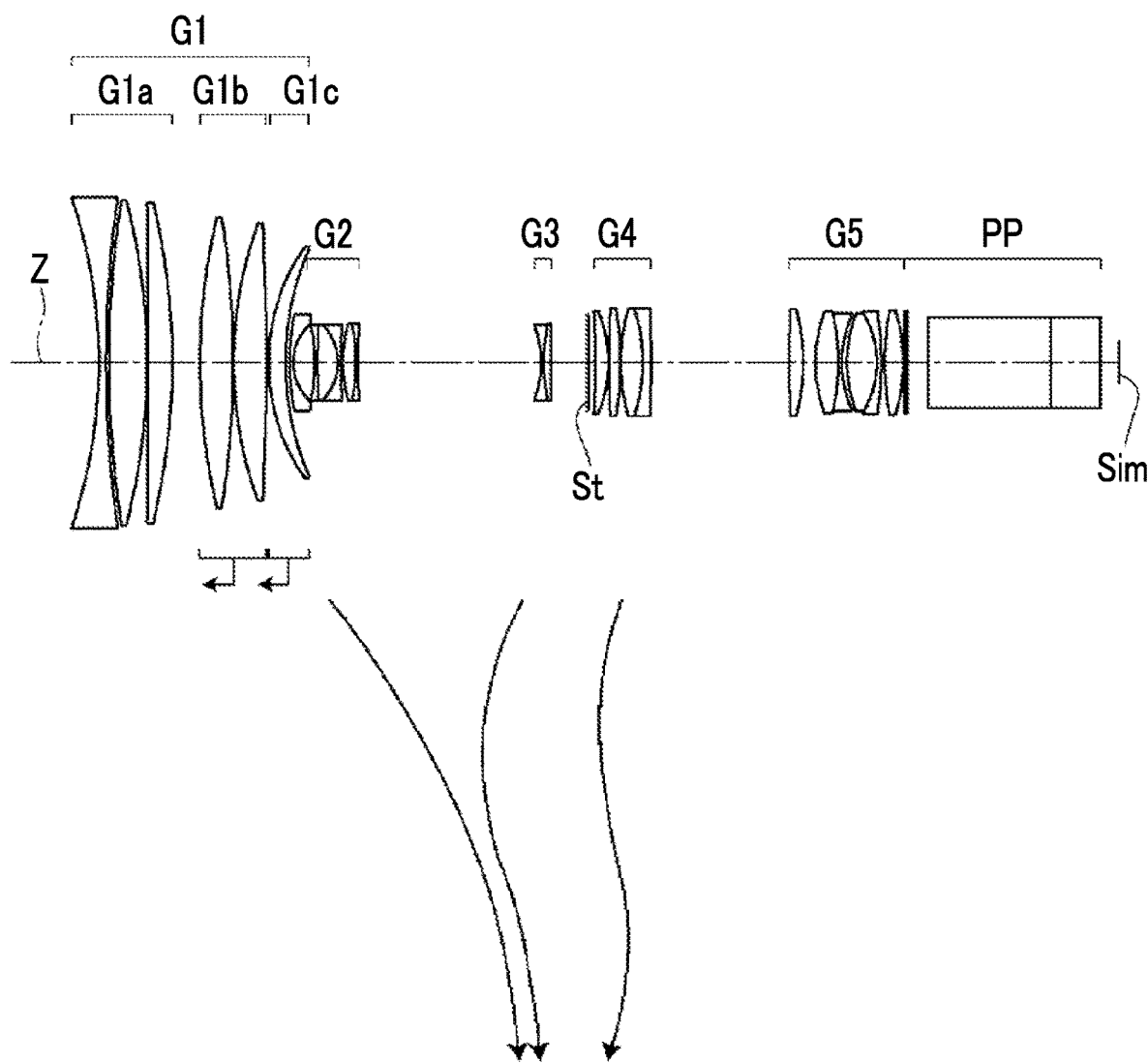
FIG. 5 is a cross-sectional view illustrating a lens configuration and a movement locus of a zoom lens of Example 4 of the present invention at the wide-angle end.

FIG. 5 is a cross-sectional view of a zoom lens of Example 4. The zoom lens of Example 4 has the same configuration as the outline of the zoom lens of Example 1. Table 10 shows basic lens data of the zoom lens of Example 4, Table 11 shows specification and variable surface distances, Table 12 shows aspheric surface coefficients, and FIG. 10 shows aberration diagrams in a state where the object at infinity is in focus.

TABLE 10

Example 4

| Surface Number | R | D | Nd | vd | θgF |
|---|---|---|---|---|---|
| 1 | −137.2092 | 2.0000 | 1.80610 | 33.27 | 0.58845 |
| 2 | 320.4925 | 0.7711 | | | |
| 3 | 284.9192 | 10.2370 | 1.43387 | 95.18 | 0.53733 |
| 4 | −170.4819 | 0.1198 | | | |
| 5 | −15036.7175 | 6.6460 | 1.43875 | 94.66 | 0.53402 |
| *6 | −171.5068 | 7.4400 | | | |
| 7 | 168.4192 | 8.9092 | 1.43387 | 95.18 | 0.53733 |
| 8 | −248.2578 | 0.1199 | | | |
| 9 | 108.6573 | 8.8054 | 1.53775 | 74.70 | 0.53936 |
| 10 | −720.1703 | 0.6000 | | | |
| 11 | 53.0748 | 4.7247 | 1.69560 | 59.05 | 0.54348 |
| 12 | 76.5961 | DD[12] | | | |
| *13 | 74.6433 | 0.9000 | 2.00100 | 29.13 | 0.59952 |
| 14 | 13.9147 | 5.8013 | | | |
| 15 | −47.4884 | 0.7448 | 1.81600 | 46.57 | 0.55625 |
| 16 | 741.4472 | 5.4952 | 1.84666 | 23.78 | 0.61923 |
| 17 | −14.2137 | 0.7350 | 1.95375 | 32.32 | 0.59015 |
| 18 | 208.6519 | 0.5446 | | | |
| 19 | 36.7764 | 3.4335 | 1.84666 | 23.78 | 0.61923 |
| 20 | −57.0576 | 0.7352 | 1.84850 | 43.79 | 0.56197 |
| 21 | 189.5427 | DD[21] | | | |
| 22 | −27.8699 | 0.7448 | 1.83400 | 37.34 | 0.57908 |
| 23 | 48.2753 | 2.0211 | 1.95906 | 17.47 | 0.65993 |
| 24 | −712.3740 | DD[24] | | | |
| 25(St) | ∞ | 2.0367 | | | |
| 26 | −239.1234 | 3.5024 | 1.58144 | 40.75 | 0.57757 |
| 27 | −35.7306 | 0.1200 | | | |
| 28 | 257.3254 | 3.1118 | 1.56883 | 56.04 | 0.54853 |
| 29 | −87.9024 | 0.1200 | | | |
| 30 | 52.7874 | 5.9005 | 1.51633 | 64.14 | 0.53531 |
| 31 | −46.0380 | 2.0988 | 1.95375 | 32.32 | 0.59015 |
| 32 | −828.9312 | DD[32] | | | |
| 33 | 335.2076 | 3.7766 | 1.62004 | 36.26 | 0.58800 |
| 34 | −58.1770 | 3.4069 | | | |
| 35 | 41.4401 | 6.1252 | 1.48749 | 70.24 | 0.53007 |
| 36 | −58.7105 | 1.1208 | 1.95375 | 32.32 | 0.59015 |
| 37 | 31.5289 | 1.3785 | | | |
| 38 | 36.7320 | 7.9798 | 1.53775 | 74.70 | 0.53936 |
| 39 | −26.0074 | 1.2412 | 1.84850 | 43.79 | 0.56197 |
| 40 | −84.3243 | 0.8502 | | | |
| 41 | 72.0921 | 5.0609 | 1.58144 | 40.75 | 0.57757 |
| 42 | −45.8872 | 0.2000 | | | |
| 43 | ∞ | 1.0000 | 1.51633 | 64.05 | 0.53531 |
| 44 | ∞ | 5.4189 | | | |
| 45 | ∞ | 33.0000 | 1.60859 | 46.44 | 0.56664 |
| 46 | ∞ | 13.2000 | 1.51633 | 64.05 | 0.53463 |
| 47 | ∞ | 5.0175 | | | |

TABLE 11

Example 4

| | WIDE | MIDDLE | TELE |
|---|---|---|---|
| Zr | 1.0 | 7.6 | 24.1 |
| f | 8.09 | 61.33 | 195.00 |
| FNo. | 1.87 | 1.87 | 3.02 |
| 2ω(°) | 74.6 | 10.2 | 3.2 |
| DD[12] | 1.16 | 44.08 | 52.21 |
| DD[21] | 49.16 | 3.02 | 2.48 |
| DD[24] | 9.67 | 13.40 | 1.24 |
| DD[32] | 37.18 | 36.67 | 41.25 |

TABLE 12

Example 4

| Surface Number | 6 | 13 |
|---|---|---|
| KA | 1.0000000E+00 | 1.0000000E+00 |
| A4 | 8.7723081E−08 | 4.5983467E−06 |
| A6 | 2.0841633E−12 | −8.2873647E−09 |
| A8 | 6.7516536E−15 | 5.9168928E−11 |
| A10 | −1.6734981E−18 | −2.1185858E−13 |

EXAMPLE 5

Figure 6:
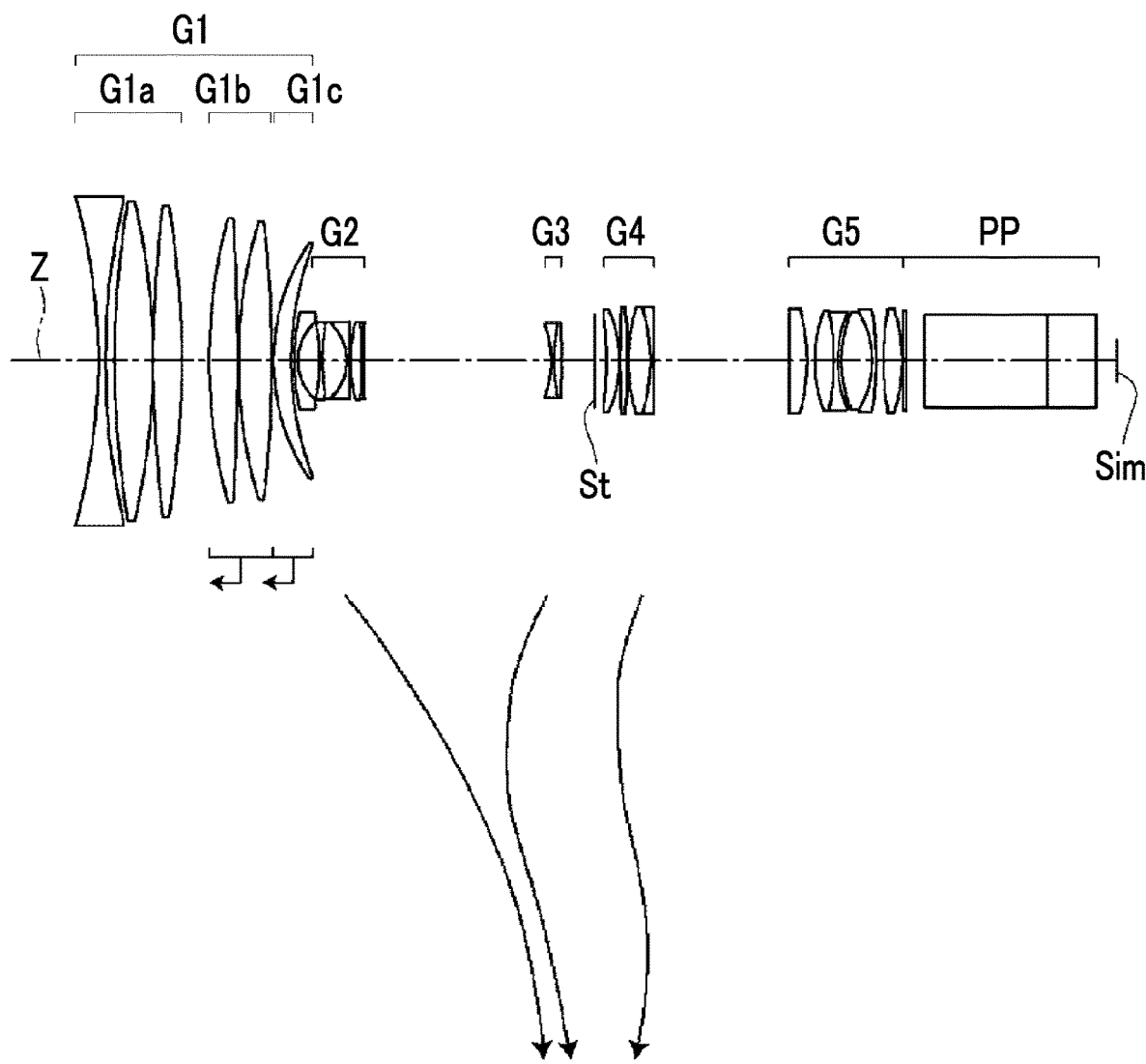
FIG. 6 is a cross-sectional view illustrating a lens configuration and a movement locus of a zoom lens of Example 5 of the present invention at the wide-angle end.

FIG. 6 is a cross-sectional view of a zoom lens of Example 5. The zoom lens of Example 5 has the same configuration as the outline of the zoom lens of Example 1. Table 13 shows basic lens data of the zoom lens of Example 5, Table 14 shows specification and variable surface distances, Table 15 shows aspheric surface coefficients, and FIG. 11 shows aberration diagrams in a state where the object at infinity is in focus.

TABLE 13

Example 5

| Surface Number | R | D | Nd | νd | θgF |
|---|---|---|---|---|---|
| 1 | −162.1297 | 2.0000 | 1.80610 | 33.27 | 0.58845 |
| 2 | 192.2582 | 2.4586 | | | |
| 3 | 258.5710 | 10.3348 | 1.43387 | 95.18 | 0.53733 |
| 4 | −189.5293 | 0.1200 | | | |
| 5 | 339.7611 | 7.6460 | 1.43875 | 94.66 | 0.53402 |
| *6 | −238.6476 | 7.3800 | | | |
| 7 | 144.4905 | 7.8214 | 1.43387 | 95.18 | 0.53733 |
| 8 | −521.5618 | 0.1200 | | | |
| 9 | 129.4287 | 8.9486 | 1.53775 | 74.70 | 0.53936 |
| 10 | −329.6720 | 0.6000 | | | |
| 11 | 56.3619 | 4.8853 | 1.69680 | 55.53 | 0.54341 |
| 12 | 86.6646 | DD[12] | | | |
| *13 | 65.3016 | 0.9000 | 2.00100 | 29.13 | 0.59952 |
| 14 | 14.0134 | 5.9191 | | | |
| 15 | −47.9056 | 0.7200 | 1.84850 | 43.79 | 0.56197 |
| 16 | 63.8057 | 6.5333 | 1.84666 | 23.78 | 0.61923 |
| 17 | −13.9693 | 0.7200 | 1.95375 | 32.32 | 0.59015 |
| 18 | 556.3770 | 0.1821 | | | |
| 19 | 36.7697 | 2.8346 | 1.84666 | 23.78 | 0.61923 |
| 20 | −424.6891 | 0.7200 | 1.84850 | 43.79 | 0.56197 |
| 21 | 143.8806 | DD[21] | | | |
| 22 | −27.5552 | 0.7450 | 1.83400 | 37.34 | 0.57908 |
| 23 | 47.5569 | 2.0184 | 1.95906 | 17.47 | 0.65993 |
| 24 | −783.3083 | DD[24] | | | |
| 25(St) | ∞ | 2.9563 | | | |
| 26 | −147.8722 | 3.7251 | 1.58913 | 61.13 | 0.54067 |
| 27 | −32.3745 | 0.1200 | | | |
| 28 | 334.8956 | 2.0533 | 1.80518 | 25.42 | 0.61616 |

TABLE 13-continued

Example 5

| Surface Number | R | D | Nd | νd | θgF |
|---|---|---|---|---|---|
| 29 | −153.3630 | 0.1200 | | | |
| 30 | 47.1075 | 5.9897 | 1.51680 | 64.20 | 0.53430 |
| 31 | −47.1461 | 1.0000 | 1.95375 | 32.32 | 0.59015 |
| 32 | 23860.1709 | DD[32] | | | |
| 33 | −1304.4831 | 4.7639 | 1.67270 | 32.10 | 0.59891 |
| 34 | −51.2599 | 2.0584 | | | |
| 35 | 36.8696 | 5.2426 | 1.48749 | 70.24 | 0.53007 |
| 36 | −63.6002 | 1.0000 | 1.95375 | 32.32 | 0.59015 |
| 37 | 30.3100 | 1.1840 | | | |
| 38 | 33.2425 | 8.3232 | 1.53775 | 74.70 | 0.53936 |
| 39 | −25.1525 | 1.0000 | 1.87070 | 40.73 | 0.56825 |
| 40 | −86.6915 | 2.0474 | | | |
| 41 | 83.3236 | 5.0177 | 1.58144 | 40.75 | 0.57757 |
| 42 | −44.6997 | 0.2000 | | | |
| 43 | ∞ | 1.0000 | 1.51633 | 64.14 | 0.53531 |
| 44 | ∞ | 4.9355 | | | |
| 45 | ∞ | 33.0000 | 1.60859 | 46.44 | 0.56664 |
| 46 | ∞ | 13.2000 | 1.51633 | 64.05 | 0.53463 |
| 47 | ∞ | 5.5046 | | | |

TABLE 14

Example 5

| | WIDE | MIDDLE | TELE |
|---|---|---|---|
| Zr | 1.0 | 7.2 | 22.2 |
| f | 7.87 | 56.57 | 174.28 |
| FNo. | 1.87 | 1.87 | 2.76 |
| 2ω(°) | 76.6 | 11.0 | 3.6 |
| DD[12] | 0.86 | 44.61 | 53.48 |
| DD[21] | 50.73 | 3.13 | 4.03 |
| DD[24] | 8.90 | 12.66 | 1.35 |
| DD[32] | 36.48 | 36.57 | 38.11 |

TABLE 15

Example 5

| Surface Number | 6 | 13 |
|---|---|---|
| KA | 1.0000000E+00 | 1.0000000E+00 |
| A4 | 8.9384180E−08 | 4.8657388E−06 |
| A6 | −1.5918442E−12 | −1.5444656E−08 |
| A8 | 9.3153723E−15 | 1.1417185E−10 |
| A10 | −2.3561898E−18 | −3.4831396E−13 |

Table 16 shows values corresponding to Conditional Expressions (1) to (7) of the zoom lenses of Examples 1 to 5. In Examples 1 to 5, the d line is set as the reference wavelength. Table 16 shows the values on the d line basis.

TABLE 16

| Expression Number | | Example 1 | Example 2 | Example 3 | Example 4 | Example 5 |
|---|---|---|---|---|---|---|
| (1) | θgF1p + 0.0017 × ν1p | 0.64141 | 0.64141 | 0.64387 | 0.64387 | 0.63781 |
| (2) | νave1p | 85.81 | 85.81 | 85.12 | 83.75 | 83.05 |
| (3) | N1p | 1.764 | 1.764 | 1.696 | 1.696 | 1.697 |
| (4) | fG1/f1n | −0.63 | −0.61 | −0.59 | −0.59 | −0.65 |
| (5) | f1p/fG1 | 2.71 | 2.65 | 2.82 | 3.24 | 3.06 |
| (6) | ft/fG1 | 2.63 | 2.63 | 2.64 | 2.76 | 2.45 |
| (7) | ν3n − ν3p | 20.86 | 24.30 | 20.86 | 19.87 | 19.87 |

As can be seen from the above data, in the zoom lens of Examples 1 to 5, the high zoom ratio is ensured such that the zoom ratio is 22, reduction in size and weight is achieved, and various aberrations including chromatic aberration are satisfactorily corrected, whereby high optical performance is achieved.

Figure 12:
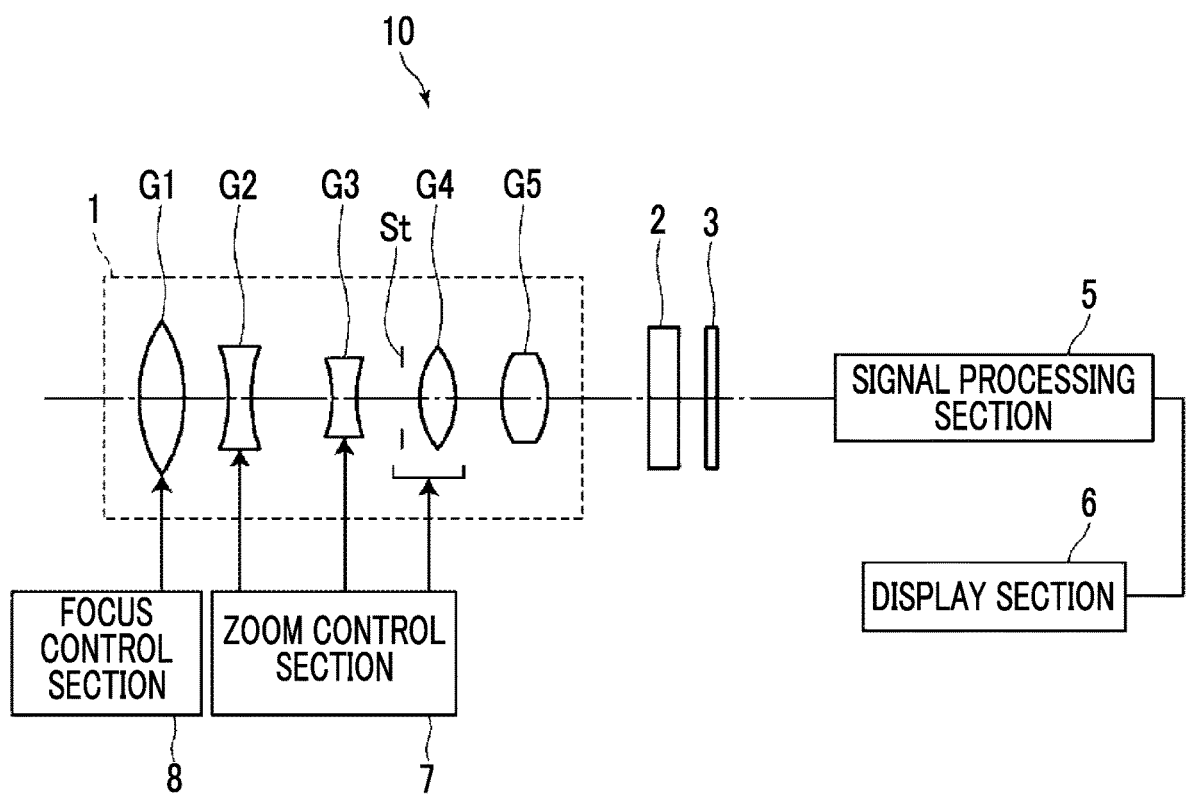
FIG. 12 is a schematic configuration diagram of an imaging apparatus according to an embodiment of the present invention.

Next, an imaging apparatus according to an embodiment of the present invention will be described. FIG. 12 is a schematic configuration diagram of an imaging apparatus 10 using the zoom lens 1 according to the above-mentioned embodiment of the present invention as an example of an imaging apparatus of an embodiment of the present invention. Examples of the imaging apparatus 10 include a movie imaging camera, a broadcast camera, a movie imaging camera, a digital camera, a video camera, a surveillance camera, and the like.

The imaging apparatus 10 comprises a zoom lens 1, a filter 2 which is disposed on the image side of the zoom lens 1, and an imaging element 3 which is disposed on the image side of the filter 2. FIG. 12 schematically shows the first lens group G1, the second lens group G2, the third lens group G3, the aperture stop St, the fourth lens group G4, the fifth lens group G5 which are provided in the zoom lens 1.

The imaging element 3 captures an optical image, which is formed through the zoom lens 1, and converts the image into an electrical signal. For example, charge coupled device (CCD), complementary metal oxide semiconductor (CMOS), or the like may be used. The imaging element 3 is disposed such that the imaging surface thereof is coplanar with the image plane of the zoom lens 1.

The imaging apparatus 10 also comprises a signal processing section 5 which performs calculation processing on an output signal from the imaging element 3, a display section 6 which displays an image formed by the signal processing section 5, a zoom control section 7 which controls zooming of the zoom lens 1, and a focus control section 8 which controls focusing of the zoom lens 1. It should be noted that FIG. 12 shows only one imaging element 3, but the imaging apparatus of the present invention is not limited to this, and may be a so-called three-plate imaging apparatus having three imaging elements.

The present invention has been hitherto described through embodiments and examples, but the present invention is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the numerical examples, and different values may be used therefor.

What is claimed is:

1. A zoom lens consisting of, in order from an object side to an image side:
a first lens group that has a positive refractive power;
a second lens group that has a negative refractive power;
a third lens group that has a negative refractive power;
a stop;
a fourth lens group that has a positive refractive power; and
a fifth lens group that has a positive refractive power,
wherein during zooming from a wide-angle end to a telephoto end, the first lens group and the fifth lens group remain stationary with respect to an image plane, the second lens group, the third lens group, the stop, and the fourth lens group move in a direction of an optical axis, and all distances between adjacent lens groups in the direction of the optical axis changes,
wherein a most image side positive lens having a positive refractive power is disposed to be closest to the image side in the first lens group, and
wherein assuming that a partial dispersion ratio of the most image side positive lens between a g line and an F line is $\theta gF1p$ and an Abbe number of the most image side positive lens at a d line is $v1p$, Conditional Expression (1) is satisfied, $$0.6376 < \theta gF1p + 0.0017 \times v1p < 0.7 \quad (1).$$

2. The zoom lens according to claim 1, wherein assuming that an average of Abbe numbers of all positive lenses included in the first lens group at the d line is $vave1p$, Conditional Expression (2) is satisfied, $$76 < vave1p < 93 \quad (2).$$

3. The zoom lens according to claim 1, wherein assuming that a refractive index of the most image side positive lens at the d line is $N1p$, Conditional Expression (3) is satisfied, $$1.68 < N1p < 1.78 \quad (3).$$

4. The zoom lens according to claim 1, wherein a most object side negative lens having a negative refractive power is disposed to be closest to the object side in the first lens group.

5. The zoom lens according to claim 4, wherein assuming that a focal length of the first lens group in a state where an object at infinity is in focus is $fG1$ and a focal length of the most object side negative lens is $f1n$, Conditional Expression (4) is satisfied, $$-0.72 < fG1/f1n < -0.52 \quad (4).$$

6. The zoom lens according to claim 1, wherein assuming that a focal length of the most image side positive lens is $f1p$ and a focal length of the first lens group in a state where an object at infinity is in focus is $fG1$, Conditional Expression (5) is satisfied, $$2.2 < f1p/fG1 < 3.7 \quad (5).$$

7. The zoom lens according to claim 1, wherein assuming that a focal length of the zoom lens at the telephoto end in a state where an object at infinity is in focus is $ft$ and a focal length of the first lens group in a state where an object at infinity is in focus is $fG1$, Conditional Expression (6) is satisfied, $$2.2 < ft/fG1 < 3 \quad (6).$$

8. The zoom lens according to claim 1, wherein focusing is performed by moving a part of lenses in the first lens group.

9. The zoom lens according to claim 1, wherein the first lens group consists of, in order from the object side to the image side, a first-a sub-lens group that remains stationary with respect to the image plane during focusing, a first-b sub-lens group that has a positive refractive power and moves toward the object side during focusing from an object at infinity to a close-range object, and a first-c sub-lens group that has a positive refractive power and moves toward the object side along a locus different from the first-b sub-lens group during focusing from the object at infinity to the close-range object.

10. The zoom lens according to claim 9, wherein an average of refractive indexes of all positive lenses included in the first-c sub-lens group at the d line is greater than an average of refractive indexes of all positive lenses included in the first-b sub-lens group at the d line.

11. The zoom lens according to claim 1, wherein the first lens group has three or more positive lenses.

12. The zoom lens according to claim 1, wherein the third lens group consists of, in order from the object side to the image side, a negative lens and a positive lens.

13. The zoom lens according to claim 12, wherein assuming that an Abbe number of the negative lens of the third lens group at the d line is ν3n and an Abbe number of the positive lens of the third lens group at the d line is ν3p, Conditional Expression (7) is satisfied, $$14 < \nu 3n - \nu 3p < 30 \quad (7).$$

14. The zoom lens according to claim 1, wherein the stop and the fourth lens group integrally move during zooming from the wide-angle end to the telephoto end.

15. The zoom lens according to claim 1, wherein Conditional Expression (1-1) is satisfied, $$0.6377 < \theta g F1p + 0.0017 \times \nu 1p < 0.644 \quad (1\text{-}1).$$

16. The zoom lens according to claim 2, wherein Conditional Expression (2-1) is satisfied, $$79 < \nu ave1p < 90 \quad (2\text{-}1).$$

17. The zoom lens according to claim 3, wherein Conditional Expression (3-1) is satisfied, $$1.69 < N1p < 1.77 \quad (3\text{-}1).$$

18. The zoom lens according to claim 5, wherein Conditional Expression (4-1) is satisfied, $$-0.69 < fG1/f1n < -0.55 \quad (4\text{-}1).$$

19. The zoom lens according to claim 6, wherein Conditional Expression (5-1) is satisfied, $$2.5 < f1p/fG1 < 3.4 \quad (5\text{-}1).$$

20. An imaging apparatus comprising the zoom lens according to claim 1.

* * * * *